US012709867B2

(12) United States Patent
Prokopowicz

(10) Patent No.: US 12,709,867 B2
(45) Date of Patent: Aug. 18, 2026

(54) OFFSET CONTROL STICK SYSTEM AND METHOD

(71) Applicant: MANITOU EQUIPMENT AMERICA, LLC, West Bend, WI (US)

(72) Inventor: Alexander R. Prokopowicz, West Bend, WI (US)

(73) Assignee: MANITOU EQUIPMENT AMERICA, LLC, West Bend, WI (US)

( * ) Notice: Subject to any disclaimer, the term of this patent is extended or adjusted under 35 U.S.C. 154(b) by 0 days.

(21) Appl. No.: 18/923,349

(22) Filed: Oct. 22, 2024

(65) Prior Publication Data

US 2025/0043539 A1 Feb. 6, 2025

Related U.S. Application Data

(63) Continuation of application No. 17/305,490, filed on Jul. 8, 2021, now Pat. No. 12,123,168.

(60) Provisional application No. 63/049,428, filed on Jul. 8, 2020.

(51) Int. Cl.
*E02F 9/20* (2006.01)
*F15B 13/042* (2006.01)

(52) U.S. Cl.
CPC ........ *E02F 9/2004* (2013.01); *F15B 13/0422* (2013.01)

(58) Field of Classification Search
CPC ...... F15B 13/0422; G05G 9/047; G05G 1/06; E02F 9/2004; B60N 2/797
See application file for complete search history.

(56) References Cited

U.S. PATENT DOCUMENTS

| | | | | |
|---|---|---|---|---|
| 3,766,944 | A | 10/1973 | Distler | |
| 4,069,720 | A * | 1/1978 | Thor | G05G 9/04 244/225 |
| 4,920,820 | A | 5/1990 | Ingham et al. | |
| 6,098,481 | A | 8/2000 | Mills et al. | |
| 6,429,848 | B2 | 8/2002 | An | |
| 6,722,224 | B2 | 4/2004 | Nordstrom | |
| 8,543,298 | B2 * | 9/2013 | Kontz | E02F 9/2004 701/50 |

(Continued)

FOREIGN PATENT DOCUMENTS

| | | |
|---|---|---|
| DE | 60200027 T2 | 5/2004 |
| EP | 0399484 A1 | 11/1990 |

(Continued)

OTHER PUBLICATIONS

Communication pursuant to Article 94(3) EPC for corresponding European Application No. 21184610.0, dated May 2, 2025, 7 pages.

(Continued)

*Primary Examiner* — Daphne M Barry
(74) *Attorney, Agent, or Firm* — Husch Blackwell LLP

(57) ABSTRACT

An electric joystick controller is provided that includes a socket, a correlated output device, and a handle. The socket has a base and a shaft defining an axial axis. The correlated output device is coupled to the base of the socket and sends electronic signals to a processor. The electronic signals being correlated to movement of the socket. The handle is offset from the axial axis and forms a gap between the shaft and the handle.

20 Claims, 18 Drawing Sheets

(56) References Cited

U.S. PATENT DOCUMENTS

| | | | | |
|---|---|---|---|---|
| 11,098,735 | B2 * | 8/2021 | Slightam | B66F 11/044 |
| 11,599,107 | B2 * | 3/2023 | Parazynski | G05D 1/005 |
| 11,696,633 | B1 * | 7/2023 | Parazynski | A45F 5/00<br>24/3.2 |
| 11,860,662 | B2 * | 1/2024 | Bartel | G05G 1/015 |
| 2008/0256941 | A1 | 10/2008 | Bertolasi | |
| 2008/0257090 | A1 | 10/2008 | Bertolasi | |
| 2010/0206116 | A1 * | 8/2010 | Zumbusch | G05G 9/047<br>74/471 XY |
| 2018/0051721 | A1 | 2/2018 | Kondo | |
| 2019/0041891 | A1 | 2/2019 | Parazynski | |
| 2019/0101138 | A1 | 4/2019 | Fukuda | |
| 2020/0080574 | A1 | 3/2020 | Slightam | |

FOREIGN PATENT DOCUMENTS

| | | | |
|---|---|---|---|
| EP | 3936969 | A1 | 8/1992 |
| WO | 2019134735 | A1 | 7/2019 |

OTHER PUBLICATIONS

European Search Report, European Application No. 21184610.0, dated Dec. 8, 2021, 11 pages.

* cited by examiner

OFFSET CONTROL STICK SYSTEM AND METHOD

CROSS REFERENCE TO RELATED APPLICATIONS

This application claims priority to U.S. application Ser. No. 17/305,490 filed Jul. 8, 2021 and titled "OFFSET CONTROL STICK SYSTEM AND METHOD", which claims priority under 35 U.S.C. § 119 to U.S. Application No. 63/049,428 filed Jul. 8, 2020 and titled "OFFSET CONTROL STICK," the entire contents of which are hereby fully incorporated by reference as if set forth fully herein.

BACKGROUND

The present disclosure relates generally to the field of control sticks or joysticks. The present disclosure relates specifically to electrical and hydraulic control sticks for controlling vehicles such as telehandlers and skid steers.

SUMMARY

One embodiment described herein relates to an electric joystick controller that includes a socket, a correlated output device, and a handle. The socket has a base and a shaft defining an axial axis. The correlated output device is coupled to the base of the socket and sends electronic signals to a processor. The electronic signals are correlated to movement of the socket. The handle is offset from the axial axis and forms a gap between the shaft and the handle.

In some aspects, the electric joystick controller also has a lever coupling the shaft to the handle and a rubber boot that at least partially surrounds the correlated output device and the socket. In some aspects, the electric joystick controller also has an actuator coupled to the processor. In some aspects, the processor sends electronic signals to the actuator and the correlated output device has an inductor that moves within a coil to send the electric signals to the processor that are correlated to movement of the socket via the shaft. In some aspects, the electric joystick controller also has a lever defining a transverse axis. In some aspects, the lever interconnects the shaft and the handle and creates the gap between the shaft and the handle along the transverse axis. In some aspects, the gap is a non-planar gap that separates the axial axis from the handle longitudinal axis, such that the axial axis and the handle longitudinal axis are askew in two separate planes and offset by the gap. The axial axis and the transverse axis define a first plane, and the handle longitudinal axis and the transverse axis define a second plane. In some aspects, the transverse axis is perpendicular to the axial axis and the transverse axis intersects the socket at either the shaft or the base. In some aspects, the transverse axis intersects the axial axis within one inch on either side of the base on the socket.

Some embodiments provide an electric joystick that includes a housing, a shaft, a handle, and a lever. The shaft is pivotably coupled to the housing and defines an axial axis. The handle is offset from the axial axis. The lever fixedly interconnects the shaft to the handle.

In some aspects, the lever includes a lever portion extending radially outwardly relative to the axial axis. In some aspects, the lever portion is connected to an end of the shaft and extends toward the housing. In some aspects, a bracket is adjustably coupled to a first end of the lever portion and the shaft is coupled to a second end of the lever portion. In some aspects, the bracket is at least one of translatable relative to the shaft, rotatable relative to the shaft, or radially moveable relative to the shaft along the lever portion.

In some aspects, the bracket is translatable and rotatable relative to the shaft via a slot defined in the bracket, and the bracket is radially moveable relative to the shaft via a threaded portion of the lever portion. In some aspects, the lever portion extends through the slot. In some aspects, the lever includes a bracket having a first lobe offset from the axial axis and a second lobe extending radially from the first lobe. In some aspects, the first lobe extends in a first plane, the lever includes an arm connected to the shaft, the arm and the shaft define a second plane, and the first plane is substantially orthogonal to the second plane. In some aspects, the arm is fixedly connected to the shaft. In some aspects, the first lobe is translatably and rotatably adjustable relative to the shaft, and the handle is translatably and rotatably adjustable relative to the second lobe. In some aspects, the shaft pivots about a pivot axis, the handle defines a longitudinal axis, and the longitudinal axis is offset from the pivot axis.

Some embodiments provide a joystick controller that includes a housing, a shaft, and a handle. The shaft is pivotably coupled to the housing and defines an axial axis. The handle is fixedly interconnected to the shaft via a bracket. The bracket includes a first lobe and a second lobe. The first lobe defines a first slot. The second lobe defines a second slot. The first slot extends in a first plane parallel to the axial axis. The second slot extends in a second plane nonparallel to the first plane. The handle is adjustable to a plurality of fixed positions relative to the shaft via the first slot and the second slot.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
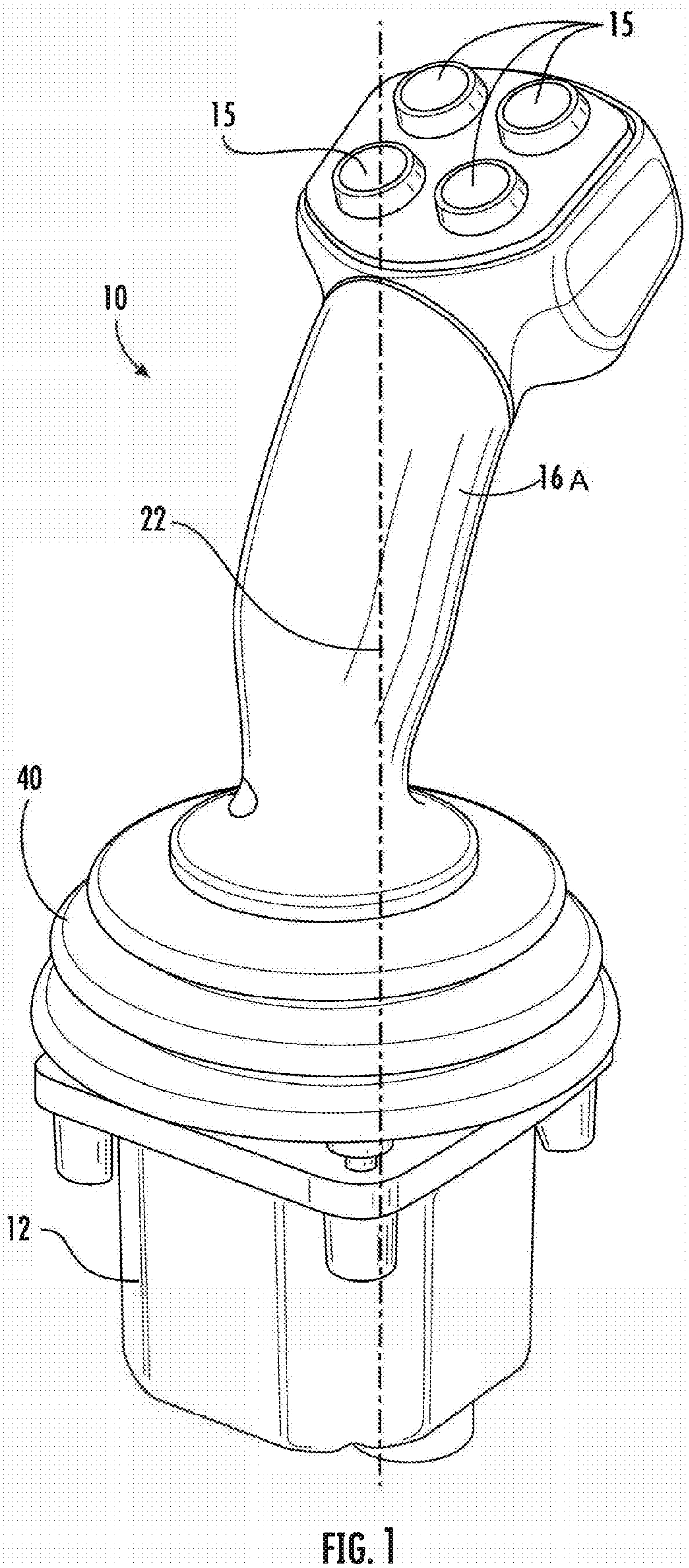
FIG. 1 is a perspective view of a control stick, according to disclosed embodiments.
Figure 2:
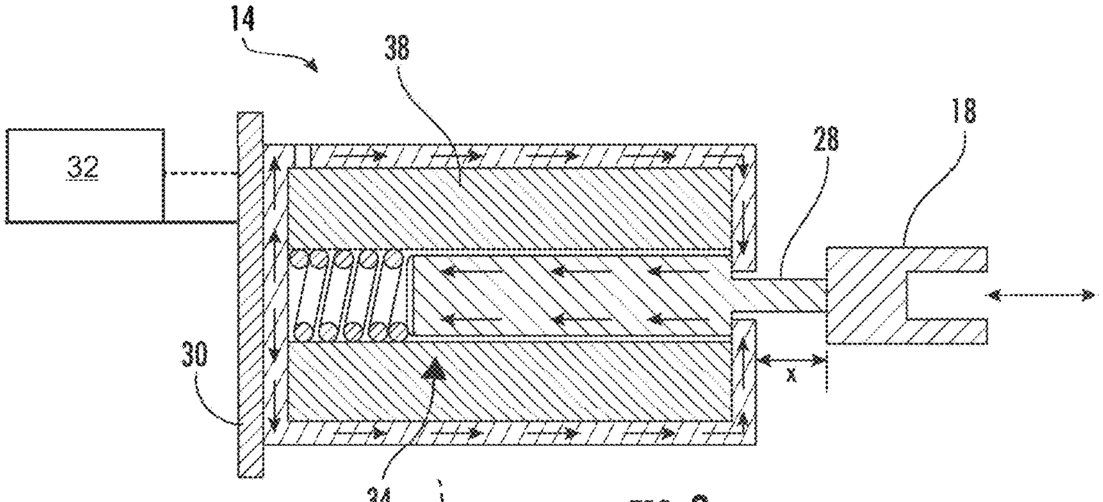
FIG. 2 is a cross-sectional view of a sensor, such as an electrical inductor or a hydraulic valve, according to disclosed embodiments.

FIG. 1 is a perspective view of an input device such as a control stick 10 (i.e., a joystick). Control stick 10 has a housing 12 that contains a correlated output device or sensor 14 (FIGS. 2 and 3). When the operator moves a non-offset handle 16A, an internal stick or shaft 18 moves over the sensor 14. A pivot or socket 20 is coupled at the bottom of shaft 18 and interconnects shaft 18 to sensor 14. Shaft 18 extends along and defines an axial, longitudinal axis 22. In operation, when the operator moves non-offset handle 16A, shaft 18 moves socket 20, and sensor 14 translates the movement and into control of the vehicle and/or an attachment in response. As shown in FIG. 1, control stick 10 includes electronic controls or buttons 15 that enable an operator to control components of a vehicle and/or attachment.

In some embodiments, the vehicle (e.g., such as skid-steer 24 shown in FIGS. 9-17, a ride-on loader, telehandler, or the like) can include two instances of the control stick 10 (e.g. a left control stick and a right control stick). The control sticks 10 may be disposed on opposing sides of the vehicle. In some embodiments, the left control stick 10 is generally used to drive the vehicle and the right control stick 10 is located on the operators right to control any attachments (e.g. a bucket 26 on the skid-steer 24 vehicle of FIGS. 9-17). However, various other embodiments where the operation controls of the right and left control sticks 10 are reversed or intermixed are contemplated. Control sticks 10 allow the operator to control the vehicle and/or the attachment in response to movements of the non-offset handle 16A. For example, the non-offset handles 16A of right and left control sticks 10 independently drive the vehicle and control any attachments. Specifically, in some embodiments, the left non-offset handle 16A drives the vehicle forward, backward, left and right, and right non-offset handle 16B controls rotation and lifting movement of the attachment (e.g., up and down and/or side to side).

FIG. 2 shows a cross-section of an embodiment of the correlated output device or sensor 14. As seen in FIG. 2, sensor 14 includes a solenoid 28 that couples to socket 20. The joint created between solenoid 28 and socket 20 can be a ball-and-socket joint, a rod and plate, a knuckle and a brace, or another joint. Sensor 14 communicates with a controller or processor 30 to send electronic and/or hydraulic signals to an actuator 32. In this way, sensor 14 couples to controller 30 to drive the vehicle and/or control the attachment. Actuator 32 can be provided in the form of a hydraulic actuator and/or electric actuator 32 that drives a component of the vehicle and/or the attachment. Sensor 14 couples to solenoid 28, which can be provided in the form of an electrical inductor 34 or a hydraulic valve 36 (see FIGS. 4A and 4B).

As shown in FIG. 2, in some embodiments, sensor 14 is an electronic controller that sends electronic signals to the actuator 32. Sensor 14 includes the inductor 34 that moves within a coil 38 and sends electric signals that are correlated to the movement of shaft 18. Electronic sensors 14 send signals to the controller 30. In some embodiments, a rubber boot 40 at least partially surrounds sensor 14, controller 30, and/or a portion of socket 20.

Figure 3A:
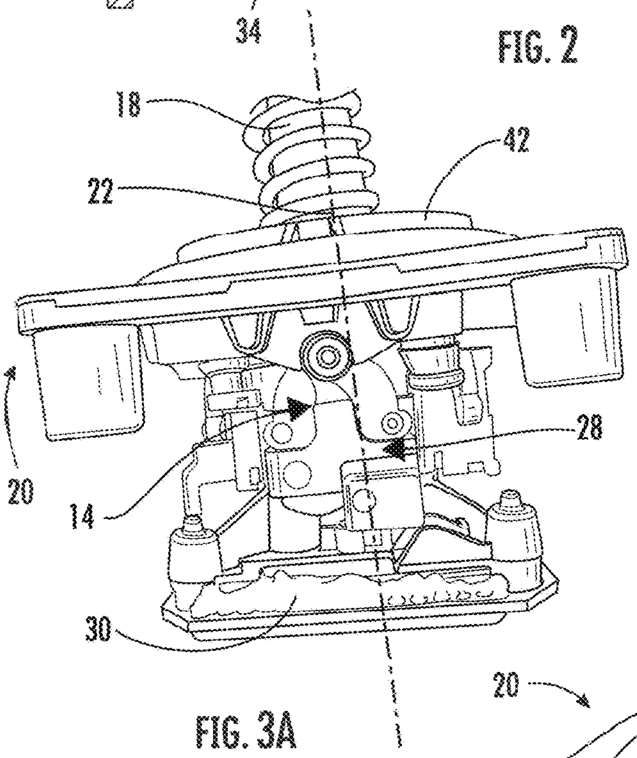
FIG. 3A is a side isometric view of a ball-and-socket joint in a control stick, according to disclosed embodiments.
Figure 3B:
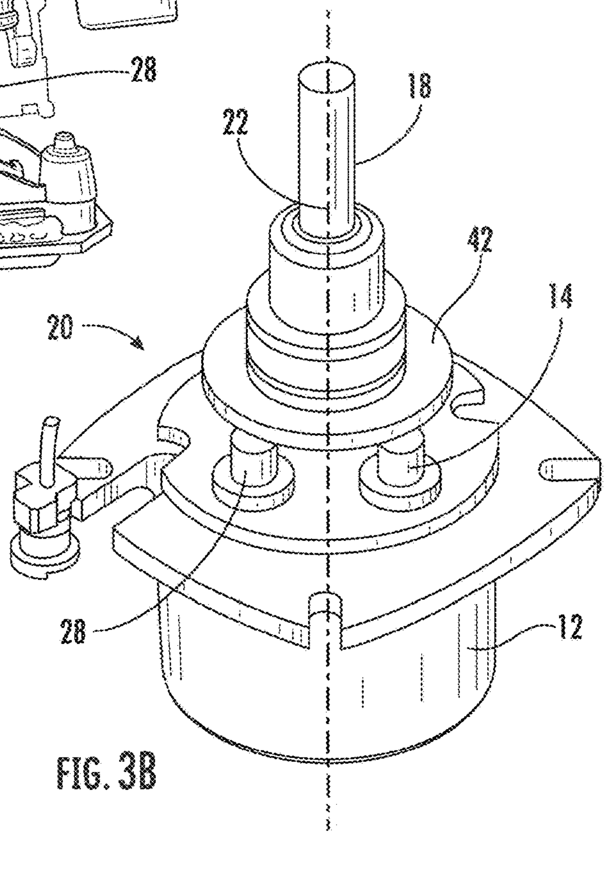
FIG. 3B is a top isometric view of a ball-and-socket joint in a control stick, according to disclosed embodiments.

FIGS. 3A and 3B show two views of socket 20 and solenoid 28 forming a ball-and-socket joint, or socket 20. Specifically, FIG. 3A shows an electric socket 20 and FIG. 3B shows a hydraulic socket 20. Shaft 18 couples to socket 20 that has a plate or base 42 coupled to balls or solenoids 28. When the operator moves non-offset handle 16A, shaft 18 moves socket 20 to depress solenoid 28. The displacement of each solenoid 28 is correlated to the movement of non-offset handle 16A. For example, in some embodiments, solenoid 28 is coupled to sensor 14 that is an inductive coil 38 coupled to an electric actuator 32 (FIG. 2). In some embodiments, solenoid 28 is coupled to sensor 14 on a hydraulic pilot valve 36 coupled to a hydraulic cylinder actuator 32 (FIGS. 4A and 4B).

FIG. 3B shows four sensors 14 in solenoids 28. The four solenoids 28 are located in a cross-wise pattern relative to a base 42 of shaft 18 to form a socket 20. When the operator moves non-offset handle 16A, shaft 18 rotates at socket 20 to depress one or more solenoids 28 of one of the four sensors 14 a correlated response to shaft 18 movements in each of the four orthogonal directions are communicated via electrical and/or hydraulic signals to control the vehicle and/or the attachment. In this way, the operator controls non-offset handle 16A to control the vehicle and/or the attachment.

Figure 4A:
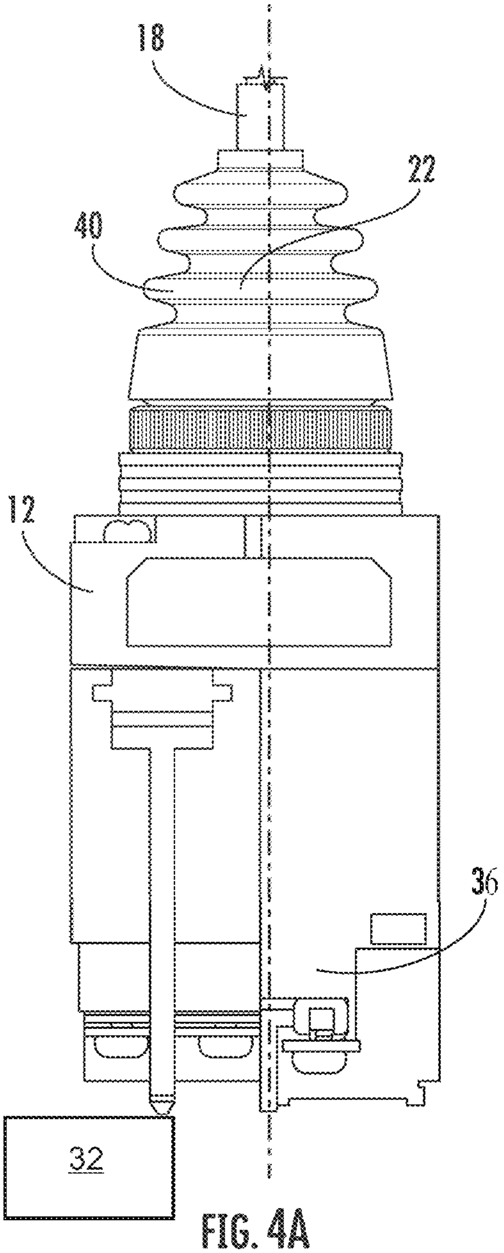
FIG. 4A is a side elevational view of a hydraulic valve on a control stick, according to disclosed embodiments.
Figure 4B:
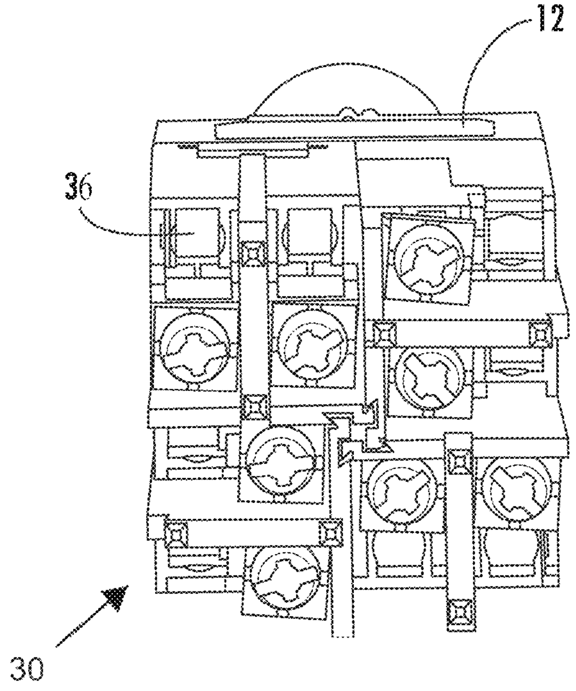
FIG. 4B is a bottom isometric view of the hydraulic valve of FIG. 4A, according to disclosed embodiments.

FIG. 4A is a side elevational view of a hydraulic control stick 10. Shaft 18 couples to base 42 under a rubber boot 40 to form a socket 20. Rubber boot 40 surrounds socket 20 and/or base 42 of socket 20, and may partially (or entirely) surround a portion of shaft 18.

When non-offset handle 16A coupled to shaft 18 is moved, socket 20 depresses one or more of the solenoids 28. Each solenoid 28 controls a hydraulic valve. FIG. 4B is a bottom perspective view of the hydraulic controller 30 of FIG. 4A. FIG. 4B shows various ports that are coupled to each solenoid 28. Hydraulic fluid travels through ports and/or valves 36 in response to base 42 depressing a corresponding solenoid 28.

Figure 5:
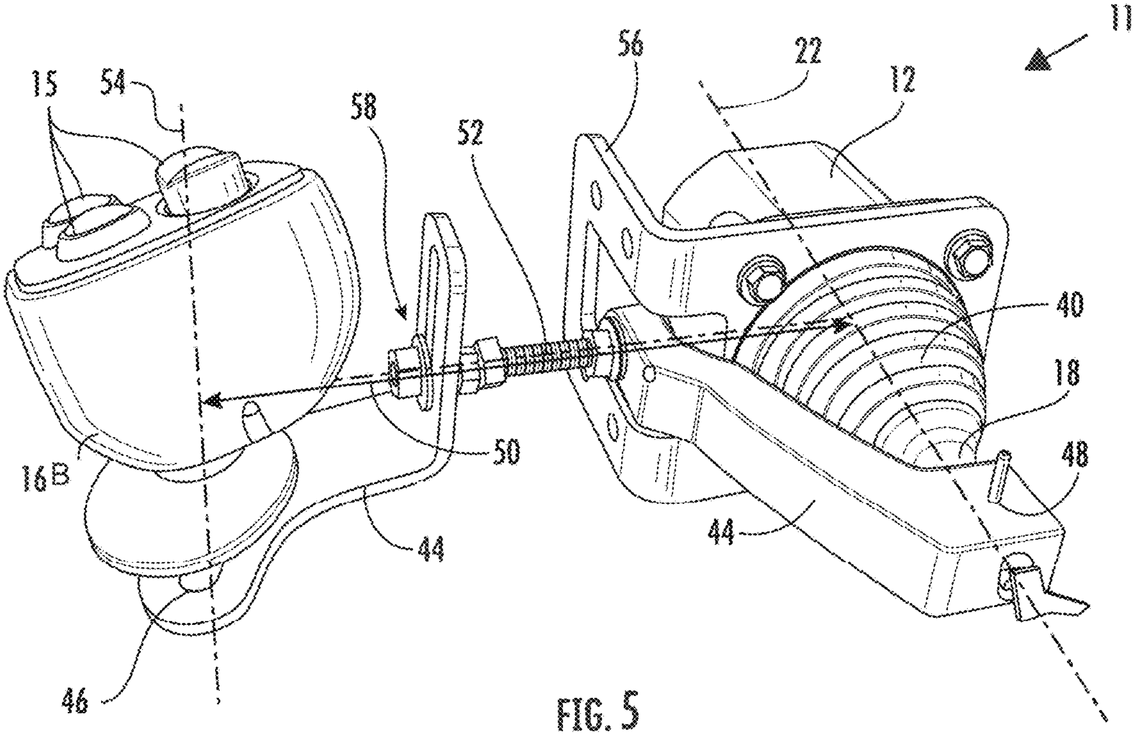
FIG. 5 is an isometric view of an offset handle coupled to the shaft of a control stick, according to disclosed embodiments.

FIG. 5 is an isometric view of a control stick 11 employing an offset version of handle 16B of the control stick 10 according to disclosed embodiments. Offset handle 16B has a lever 44 interconnecting handle 16B to the shaft 18 and other sections of the control stick 10 such as the housing 12. The offset created by lever 44 enables the operator to control the offset handle 16B with rotational movement. In particular, the operator can use wrist rotation (e.g., "wrist control") to drive, operate, and/or control the output of the vehicle and/or the attachment. For example, lever 44 offsets handle 16B to enable use of wrist controls to steer, operate, and otherwise control the machine (e.g., skid steer, lifter, boom, or other vehicle). The offset created by lever 44 makes a nonlinear, rotational, or arched rotation of offset handle 16B capable of controlling various aspects of the vehicle. In this way, rotation of the offset handle 16B in different clockwise (CW) and counter-clockwise (CCW) rotations drives and otherwise operates the vehicle and/or the attachment.

Lever 44 is coupled to shaft 18 on a first end 48 and coupled to handle 16B on a second end 46 of lever 44. Lever 44 couples shaft 18 to offset handle 16B and creates a gap 50 between shaft 18 and offset handle 16B along a transverse axis 52. As used herein, transverse means to extend across something. Accordingly, transverse axis 52 can form an acute, orthogonal (e.g., perpendicular), or obtuse angle with axial axis 22. Similarly, a longitudinal axis 54 extends through offset handle 16B and intersects transverse axis 52. Longitudinal axis 54 may form an acute, perpendicular, or obtuse angle with transverse axis 52. A support frame 56 has four bolts to secure housing 12 of control stick 10 to a fixture within the vehicle. Support frame 56 and four bolts secure housing 12 to define a direction of axial axis 22. For example, the orientation of support frame 56 and/or housing 12 defines axial axis 22 along a horizontal direction (e.g., parallel to the ground), and the longitudinal axis 54 is oriented in a substantially vertical direction inside the vehicle.

Handle longitudinal axis 54 extends through offset handle 16B and is offset from the axial axis 22 of shaft 18 by lever 44. Offset handle 16B is coupled to shaft 18 of control stick 10 via a slot fitting 58 on lever 44 that adjustably extends lever 44 along the transverse axis 52. Longitudinal axis 54 and/or axial axis 22 form an orthogonal angle with axial axis 22. Transverse axis 52 aligns with socket 20 and solenoids 28, such that transverse axis 52 intersects base 42 on shaft 18 coupled to solenoids 28. Transverse axis 52 intersects either the base 42 or the shaft 18 along axial axis 22 within one inch of base 42. For example, transverse axis 52 intersects socket 20 along axial axis 22 at base 42 or within 1 inch of base 42 along shaft 18. The angle formed between the axial axis 22 and the transverse axis 52 may be perpendicular, acute, or obtuse and may intersect shaft 18 or socket 20 at other locations along axial axis 22, e.g., below shaft 18 and/or base 42. In some embodiments, socket 20 can include a single integral part, such that base 42 and the shaft 18 are a single unitary or monolithic part.

Figure 6:
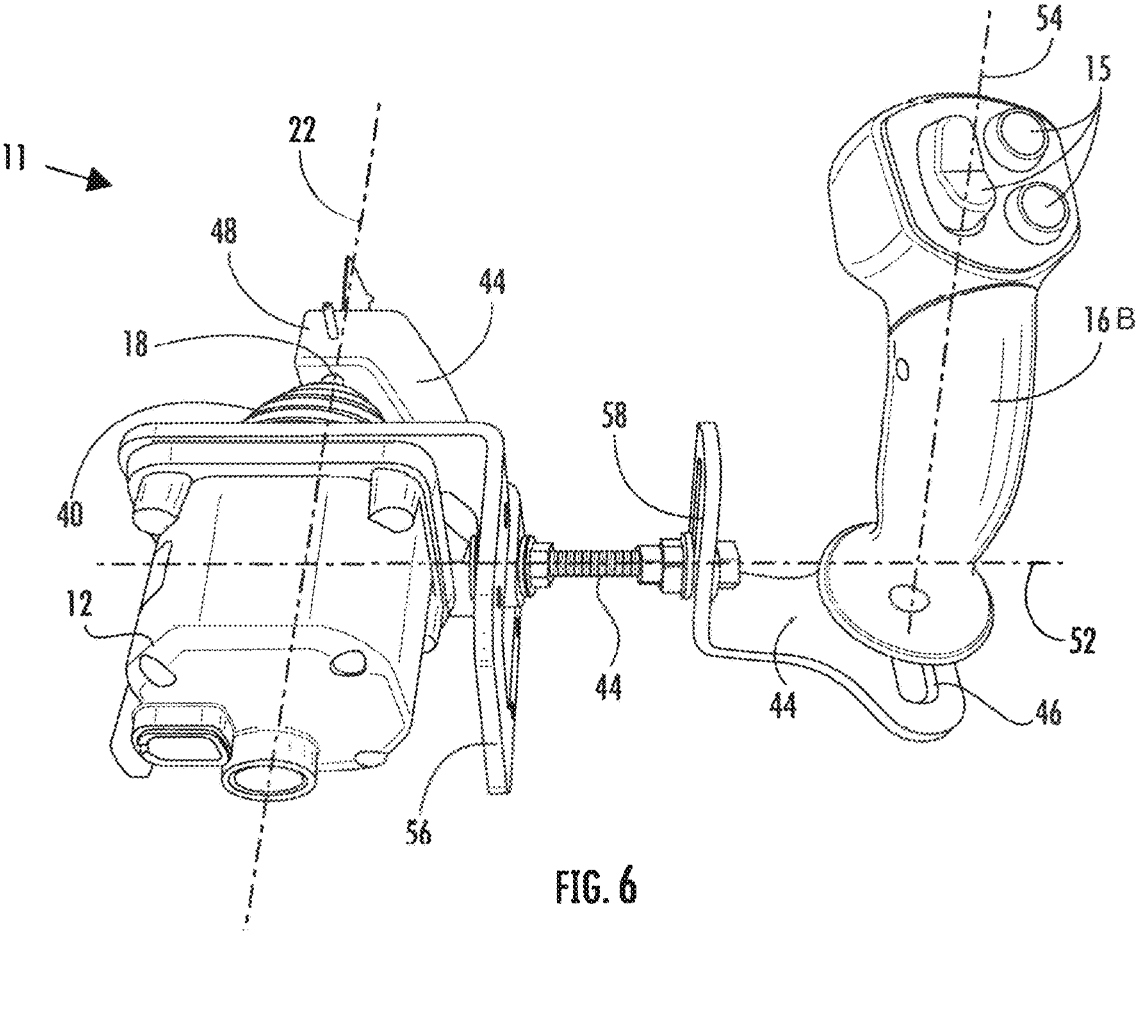
FIG. 6 is a different isometric view of an offset handle coupled to a shaft of an electric control stick, according to disclosed embodiments.

FIG. 6 is a bottom perspective view of offset handle 16B coupled to shaft 18 to form control stick 11 capable of wrist control. As shown in FIG. 6, the angle between axial axis 22 and transverse axis 52 is orthogonal or perpendicular, and the angle between longitudinal axis 54 and transverse axis 52 is also orthogonal. However, axial axis 22 and longitudinal axis 54 are askew, such that axial axis 22 and longitudinal axis 54 are neither coplanar nor parallel. For example, lever 44 creates a non-planar gap that separates axial axis 22 from longitudinal axis 54, such that axial axis 22 and longitudinal axis 54 are askew in two offset planes (e.g., two planes separated by gap 50). A first plane is defined by axial and transverse axes 22 and 52, and a second plane is defined by transverse and longitudinal axes 52 and 54. In one example, lever 44 couples socket 20 to offset handle 16B, such that lever 44 is coplanar with axial axis 22 and longitudinal axis 54.

Figure 7:
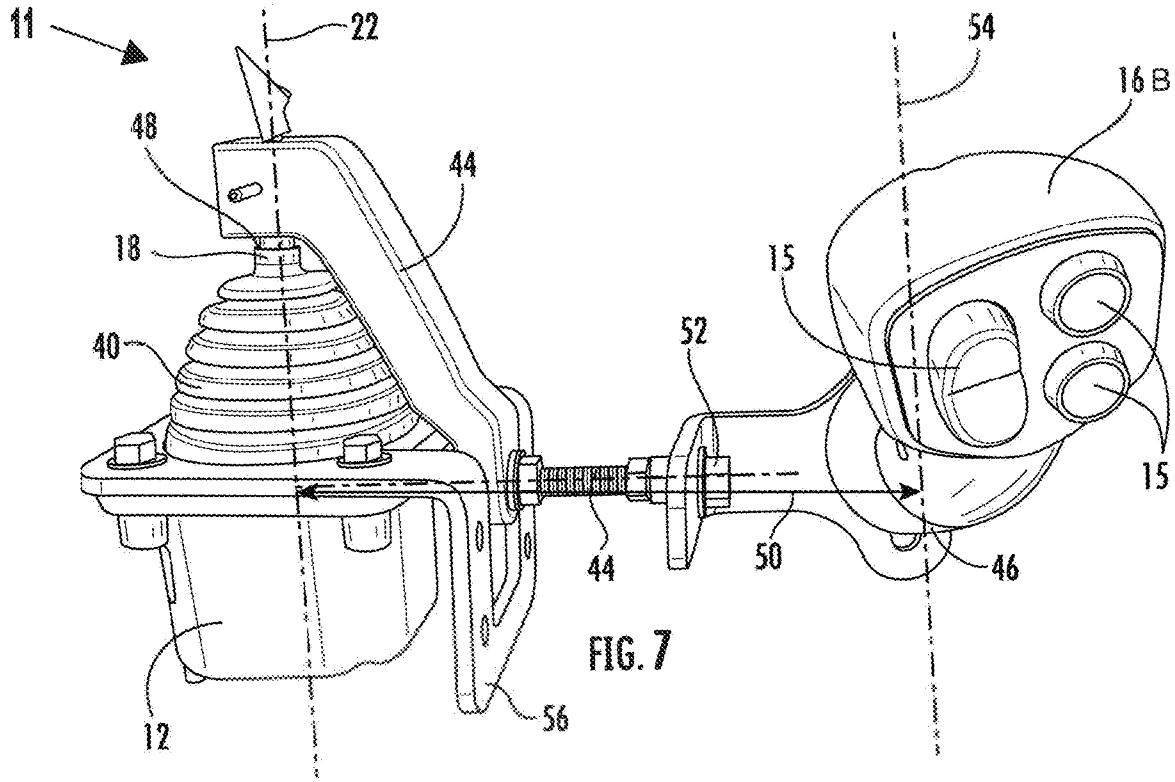
FIG. 7 is a side isometric view of an offset handle coupled to a shaft of an electric control stick, according to disclosed embodiments.

FIG. 7 is a side isometric view of offset handle 16B of control stick 11 that enables a nonlinear movement of the user's wrist to control various aspects of the vehicle and/or the attachment. Offset handle 16B is coupled to shaft 18 of electric control stick 10 by slot fitting 58 and/or lever 44 to adjust the orientation of handle 16B relative to axial axis 22 of shaft 18. Gap 50 extends along transverse axis 52 between axial axis 22 and longitudinal axis 54. As such, gap 50 defines an offset orientation for longitudinal axis 54 relative to axial axis 22 that gives control stick 11 a rotational feel. Whereas the control stick 10 of FIG. 1, moves the actuator 32 in response to correlated movement of the non-offset handle 16B in a particular direction, the control stick 11 of FIG. 7 enables an operator to control two or more solenoids 28 and/or sensors 14 simultaneously via rotation of offset handle 16B.

Figure 8:
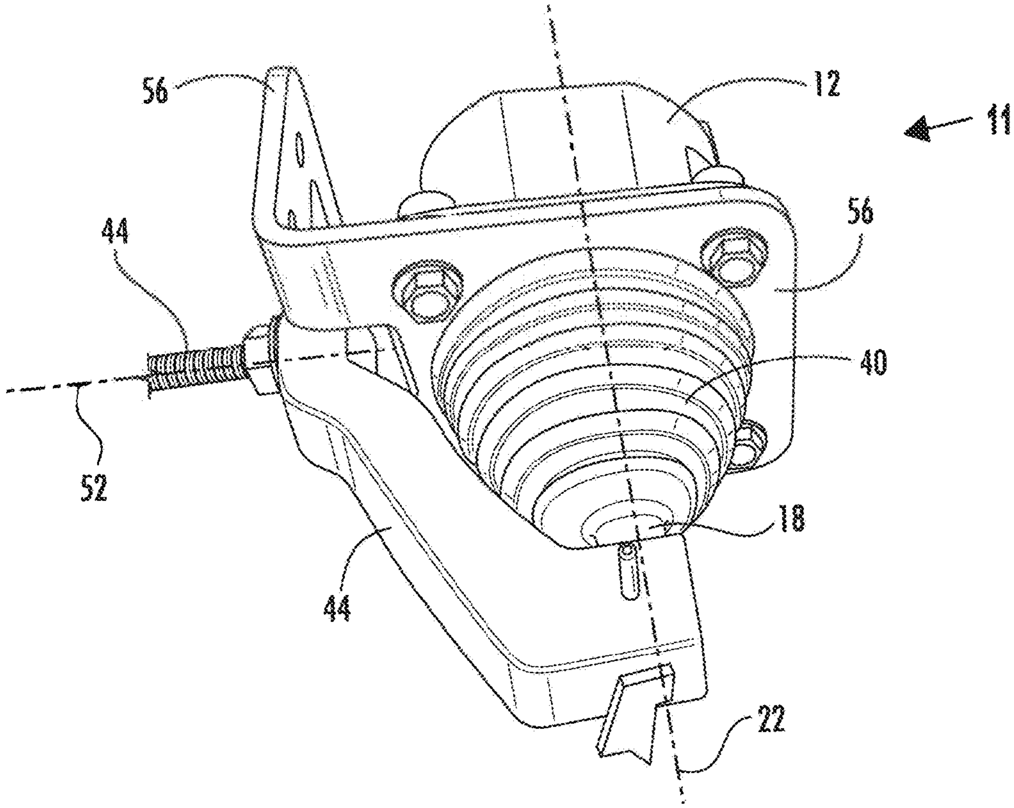
FIG. 8 is a detailed view of a housing, socket, and lever, according to disclosed embodiments.

FIG. 8 is a detailed view of the housing 12, socket 20, and lever 44. Slot fitting 58 of lever 44 defines transverse axis 52 that is oriented orthogonally to axial axis 22. As shown in FIG. 8, transverse axis 52 is perpendicular to and intersects axial axis 22 at base 42 of socket 20. FIGS. 9 to 17 show an implementation of left and right nonlinear/rotational control sticks 11 and controller 30 within a vehicle such as skid-steer 24. However, it should be noted that left and right nonlinear/rotational control sticks 10 can be implemented in connection with other vehicle types beyond the skid-steer 24, such as vehicles employing a standing or ride on configuration for the operator.

As seen in FIGS. 9 to 17, a left control stick 11 controls the vehicle wheels (or track), and a right control stick 11 controls the bucket 26 (or another attachment). However, various other embodiments where the operation controls of the right and left control sticks 11 are reversed or intermixed are contemplated. FIG. 9A is an illustration of two offset handles 16 on left and right control sticks 11 oriented in a neutral position of skid steer 24. FIG. 9B is a top perspective view of skid steer 24 vehicle and attachment or bucket 26 in the neutral position. In other words, the neutral positions of right and left control sticks 11 shown in FIG. 9A result in the neutral output shown in FIG. 9B.

Figure 9A:
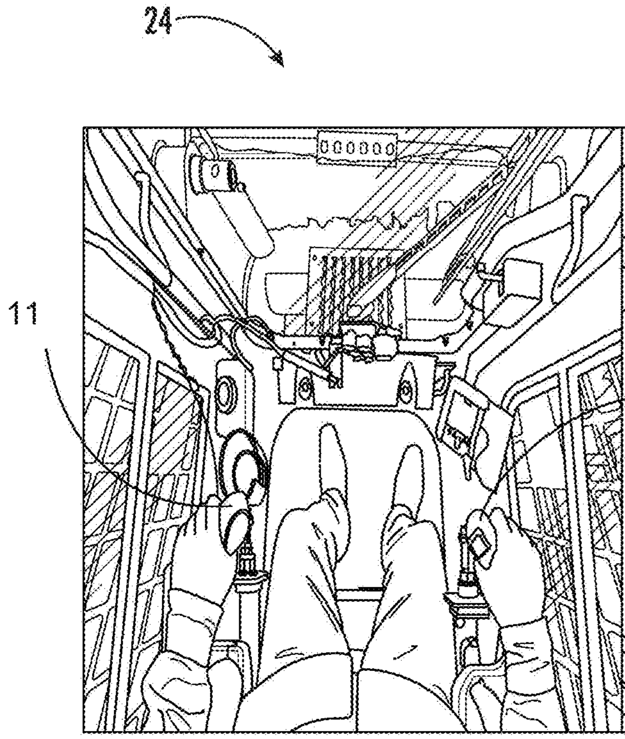
FIG. 9A is a top isometric view of two control sticks (e.g., a left control stick and a right control stick) in a neutral position in a vehicle (e.g., a skid steer), according to disclosed embodiments.
Figure 9B:
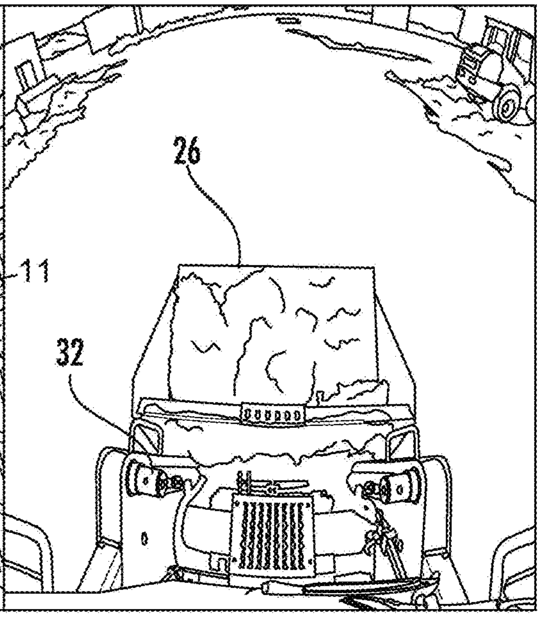
FIG. 9B is a top isometric view of the vehicle and attachment in a neutral position in response to the neutral positions of the control sticks shown in FIG. 9A.
Figure 10A:
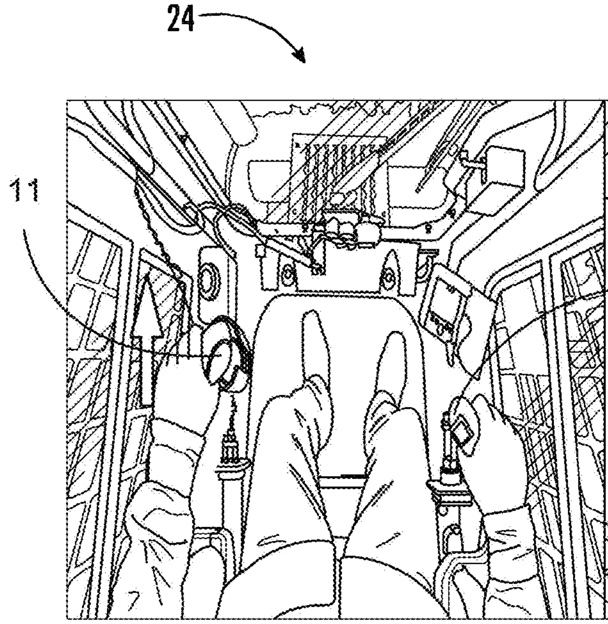
FIG. 10A is a top isometric view of an operator moving the left control stick in a forward position relative to FIG. 9A to move the vehicle forward, according to disclosed embodiments.
Figure 10B:
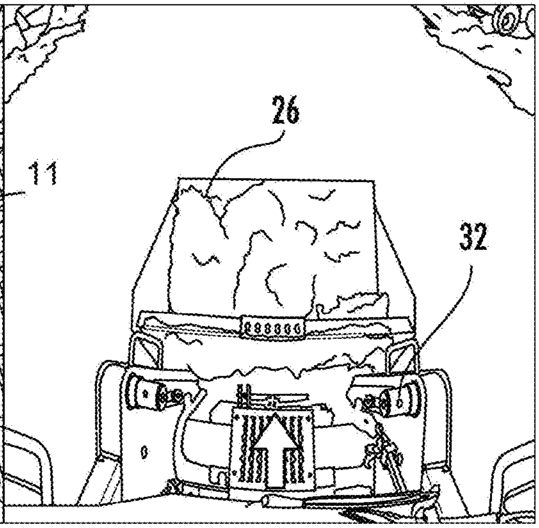
FIG. 10B is a top isometric view of the vehicle moving forward in response to the position of the left control stick in FIG. 10A.

FIG. 10A shows the operator moving/rotating left control sticks 11 in a nonlinear or arched forward position relative to the neutral positions illustrated in FIG. 9A. In the orientation of FIG. 10A, the operator moves/rotates left control stick 11 through a forward arch to move wheels of skid-steer 24 forward. FIG. 10B is a top perspective view of skid-steer 24 shown moving forward in response to the forward position of left control stick 11 shown in FIG. 10A.

Figure 11B:
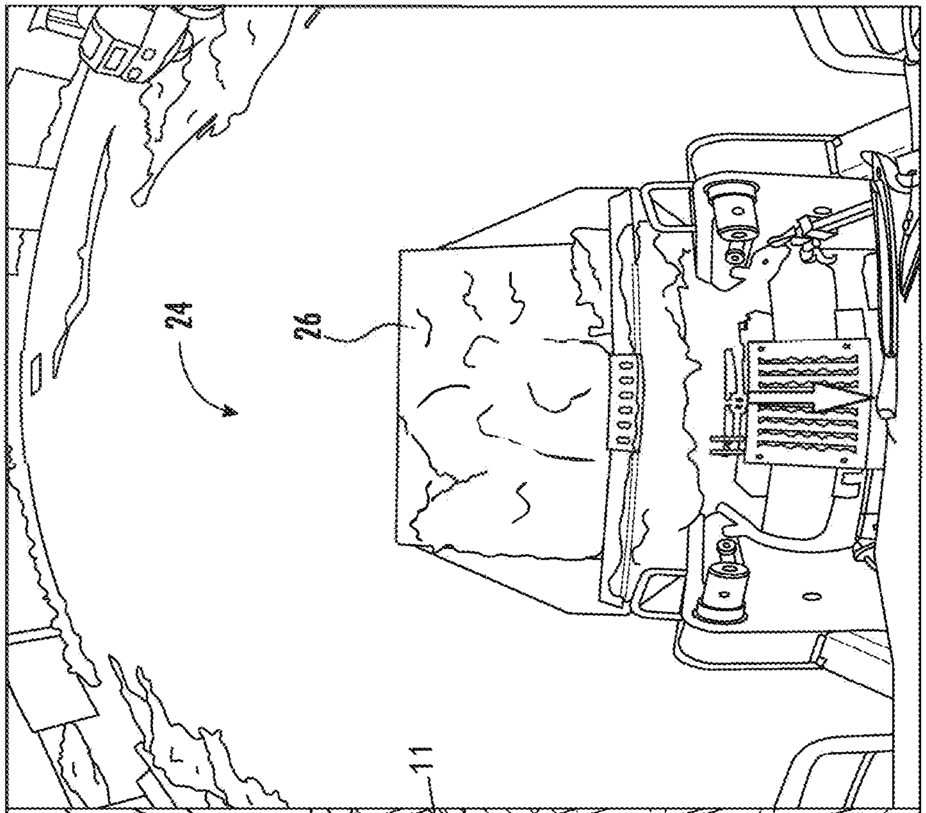
FIG. 11B is a top isometric view of the vehicle moving rearward in response to the position of the left control stick of FIG. 11A.
Figure 11A:
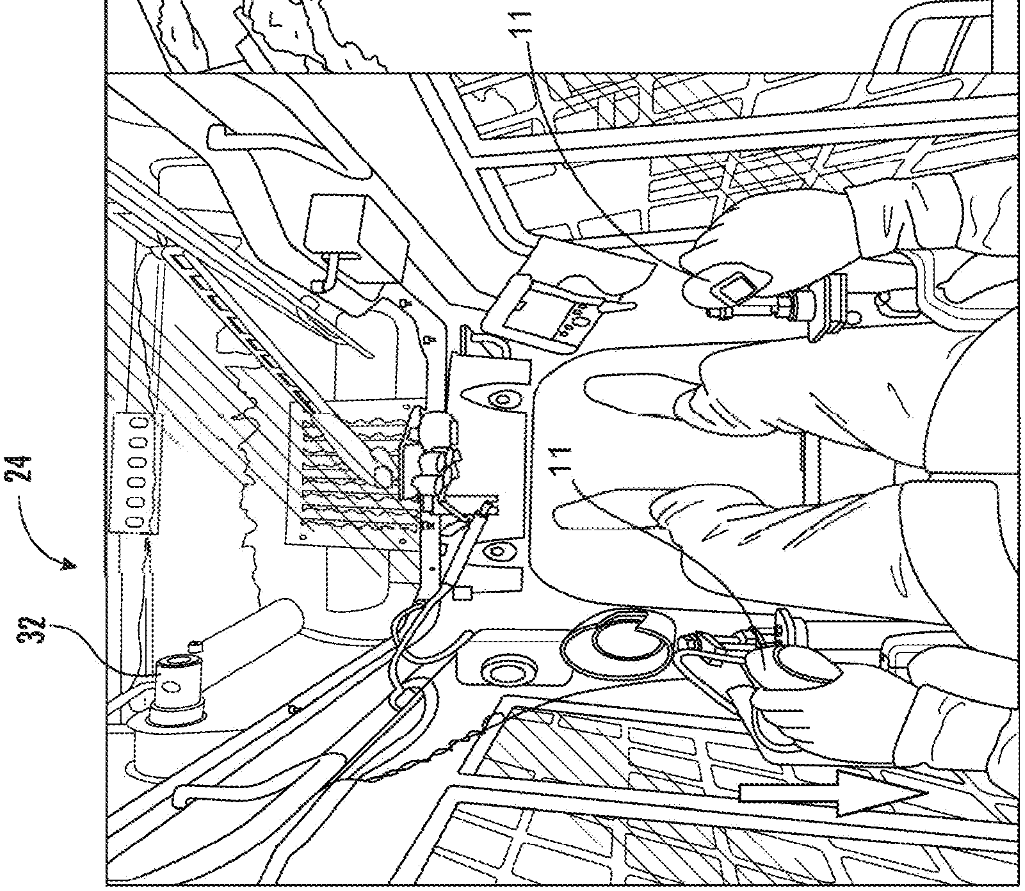
FIG. 11A is a top isometric view of an operator moving the left control stick in a rearward position relative to FIG. 9A to move the vehicle backward, according to an embodiment.

FIG. 11A shows the operator moving/rotating left control stick 11 in a nonlinear or arched backward or rearward position relative to the neutral positions illustrated in FIG. 9A. In the orientation of FIG. 11A, the operator rotates left control stick 11 rearward about a pivot to move wheels of skid-steer 24 in a rearward direction (e.g., backward). FIG. 11B shows skid-steer 24 moving in the rearward direction in response to the position of left control stick shown in FIG. 11A.

Figure 12B:
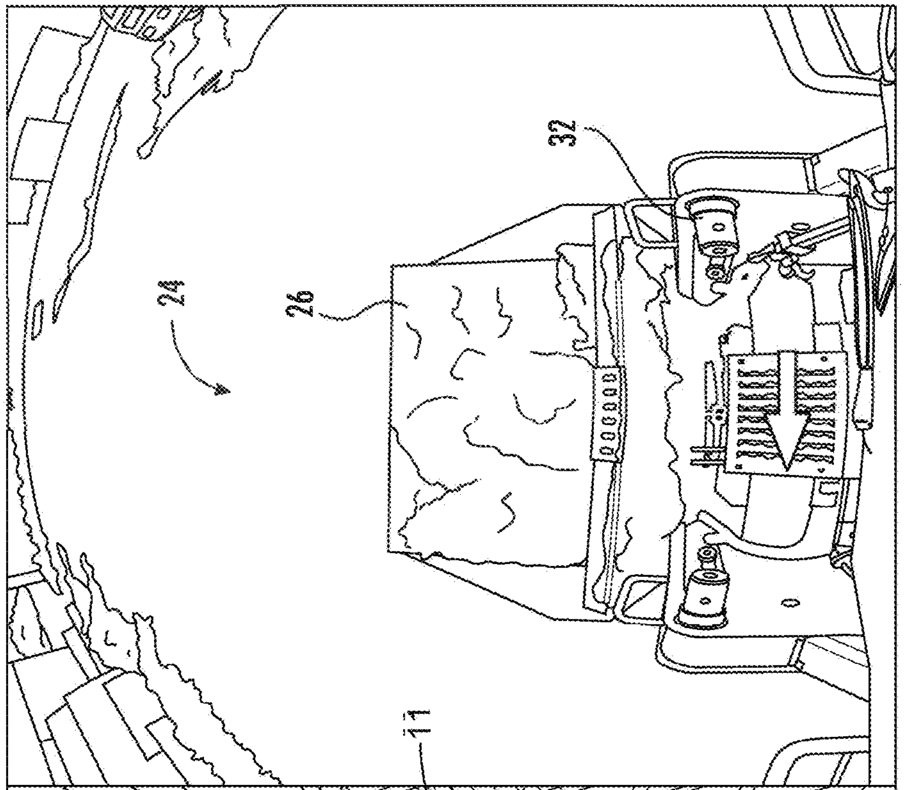
FIG. 12B is a top isometric view of the vehicle moving leftward in response to the position of the left control stick shown in FIG. 12A.
Figure 12A:
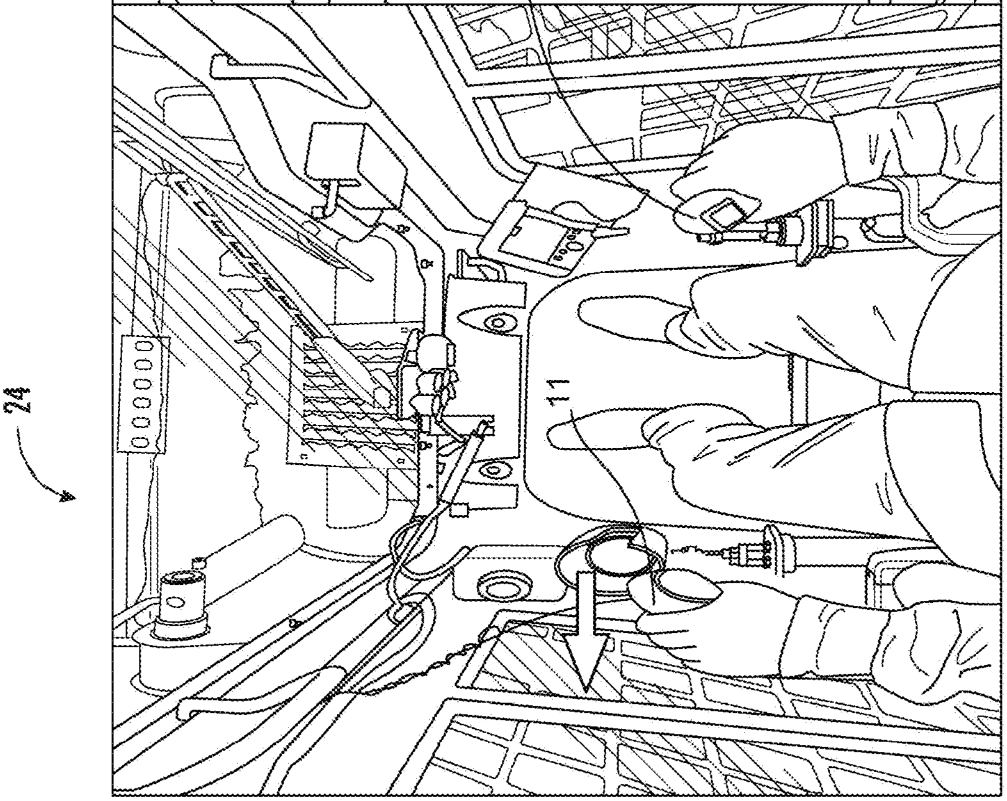
FIG. 12A is a top isometric view of an operator moving the left control stick in a nonlinear or arched leftward position relative to FIG. 9A to move the vehicle left, according to disclosed embodiments.

FIG. 12A shows the operator moving/rotating left control stick 11 in a nonlinear or arched leftward position relative to the neutral positions of control sticks 11, as illustrated in FIG. 9A. In the orientation of FIG. 12A, the operator rotates left control stick 11 about a pivot created by lever 44 in a leftward position to drive (and/or steer) wheels of skid-steer 24 left and turn the chassis of skid-steer 24 leftward. FIG. 12B shows skid-steer 24 moving leftward in response to the position of left control stick 11 shown in FIG. 12A.

Figure 13B:
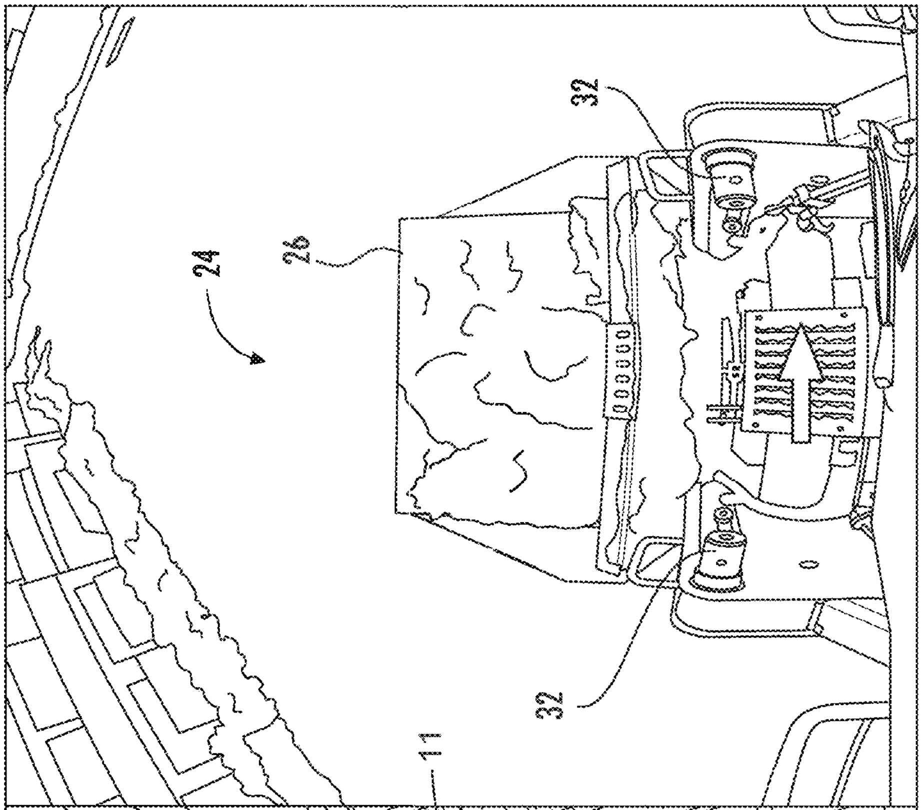
FIG. 13B is a top isometric view of the vehicle moving rightward in response to the position of the left control stick shown in FIG. 13A.
Figure 13A:
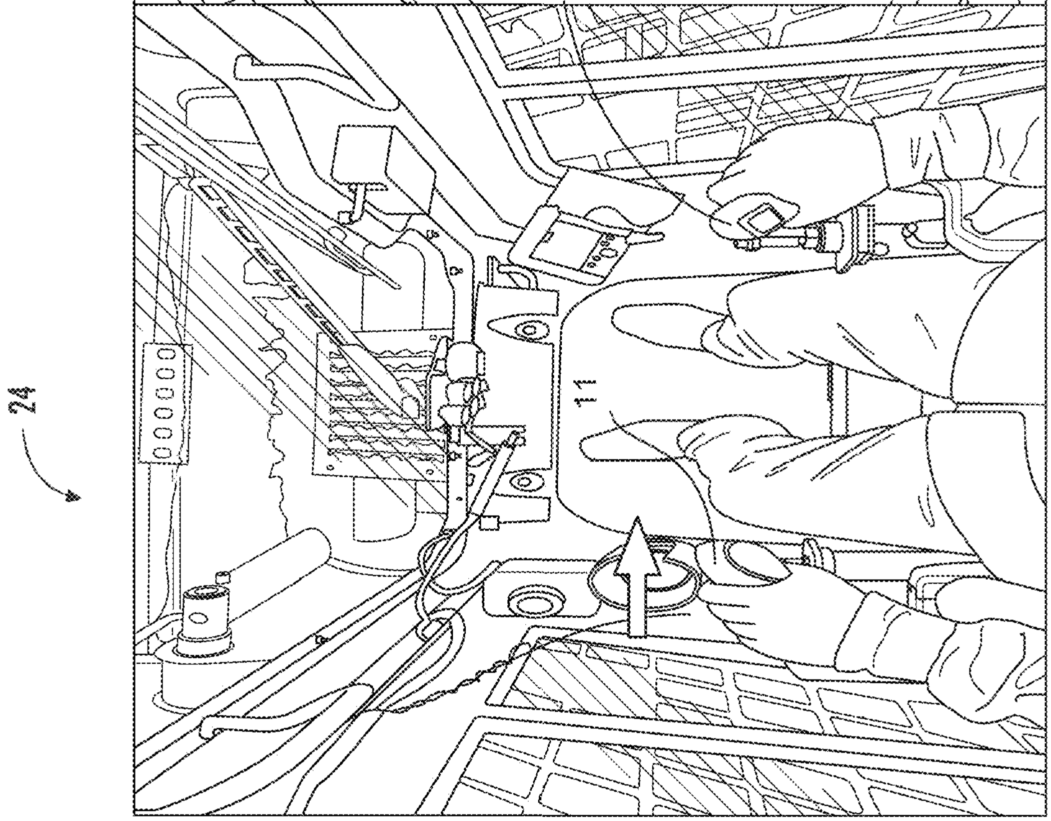
FIG. 13A is a top isometric view of an operator moving the left control stick in a nonlinear or arched rightward position relative to FIG. 9A to move the vehicle right, according to disclosed embodiments.

FIG. 13A shows the operator rotating left control stick 11 in a nonlinear or arched rightward position relative to the neutral positions illustrated in FIG. 9A. In the orientation of FIG. 13A, the operator rotates left control stick 11 about a pivot created by lever 44 into the rightward position to drive (and/or steer) wheels of skid-steer 24 right and turn the chassis of skid steer 34 rightward. FIG. 13B shows skid-steer 24 moving rightward in response to the position of the left control stick 11 shown in FIG. 13A.

Figures 14A, 14B:
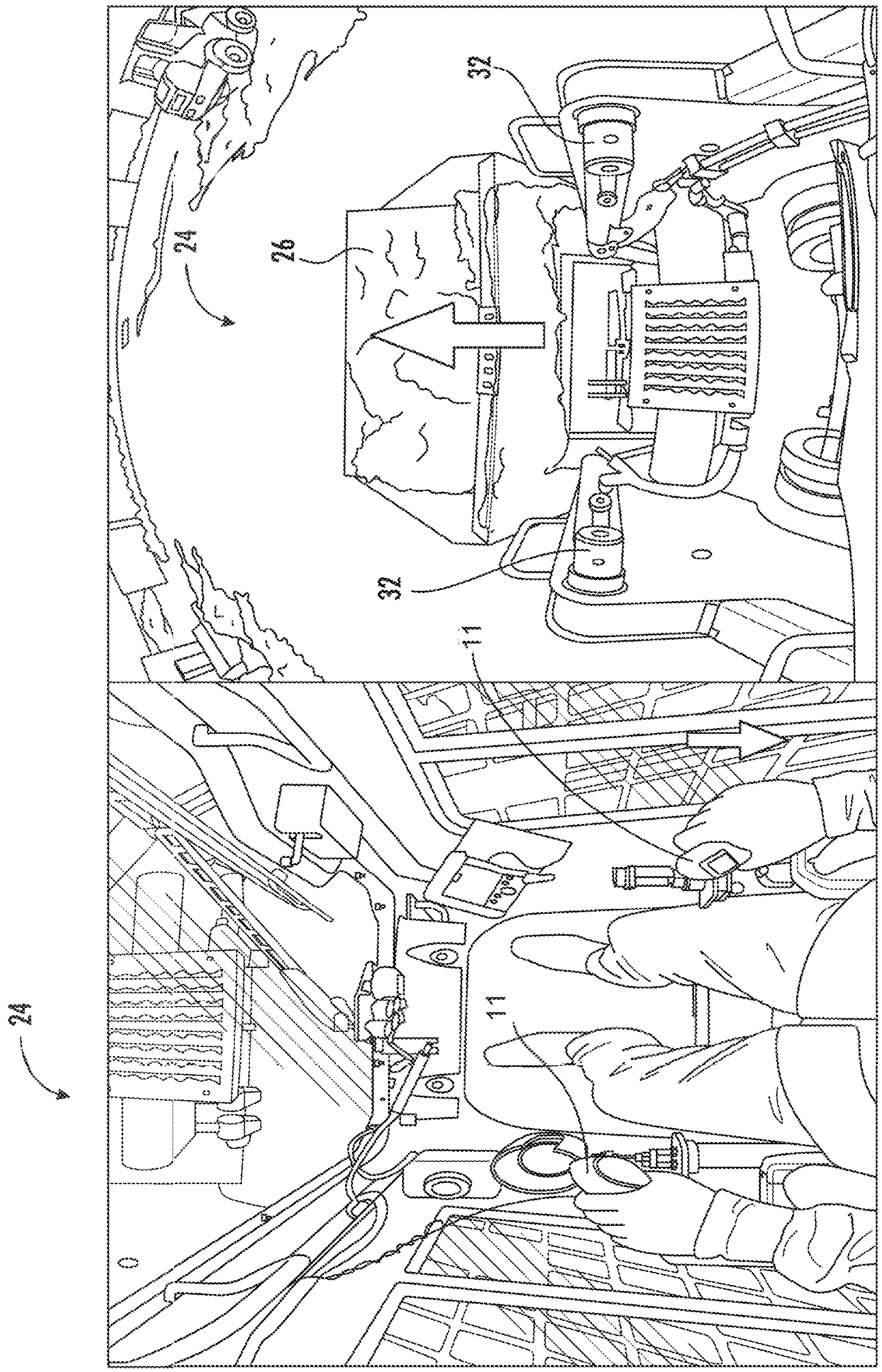
FIG. 14A is a top isometric view of an operator moving the right control stick in a nonlinear or arched rearward position relative to FIG. 9A to move the bucket attachment upward, according to disclosed embodiments.
FIG. 14B is a top isometric view of the bucket attachment moving upward in response to the position of the right control stick shown in FIG. 14A.

FIG. 14A shows the operator rotating right control stick 11 in a nonlinear or arched rearward position relative to the neutral positions illustrated in FIG. 9A. In the orientation of FIG. 14A, the operator rotates right control stick 11 in a nonlinear or arched rearward direction (e.g., about a pivot) to move bucket 26 of skid-steer 24 upwards. FIG. 14B shows bucket 26 moving up in response to the position of the right control stick 11 shown in FIG. 14A.

Figure 15A:
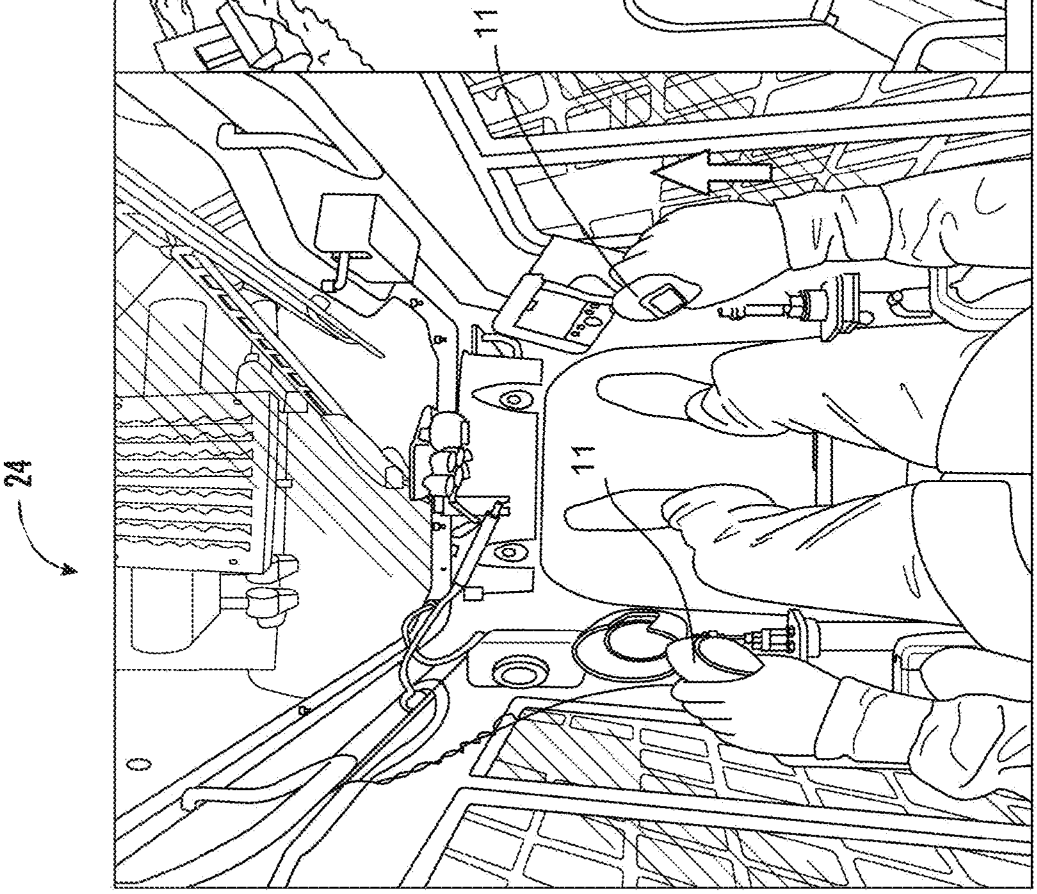
FIG. 15A is a top isometric view of the operator moving the right control stick in a nonlinear or arched forward position relative to FIG. 9A to move the bucket attachment downward, according to disclosed embodiments.
Figure 15B:
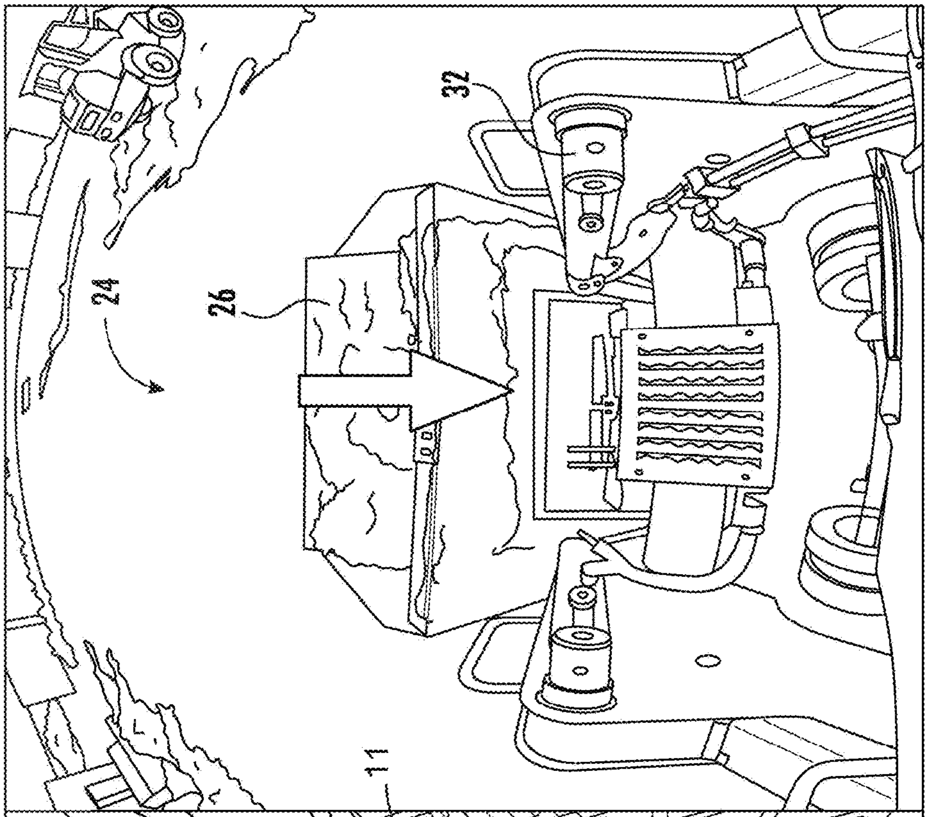
FIG. 15B is a top isometric view of the bucket attachment moving downward in response to the position of the right control stick shown in FIG. 15A.

FIG. 15A shows the operator pivoting right control stick 11 in a nonlinear or arched forward position relative to the neutral positions illustrated in FIG. 9A. In the orientation of FIG. 15A, the operator pivots right control stick 11 about lever 44 in the forward direction to move bucket 26 of skid-steer 24 down. FIG. 15B shows bucket 26 of skid-steer 24 moving downwards in response to the position of the right control stick 11 shown in FIG. 15A.

Figure 16B:
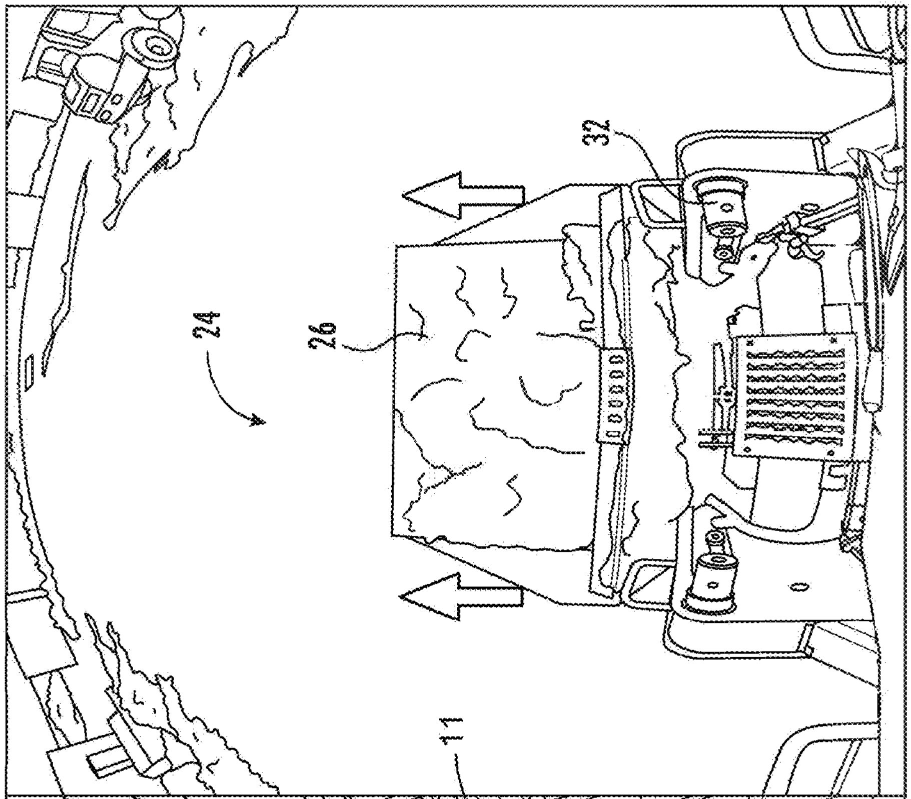
FIG. 16B is a top isometric view of the bucket attachment tilting or rotating upwards in response to the position of the right control stick shown in FIG. 16A.
Figure 16A:
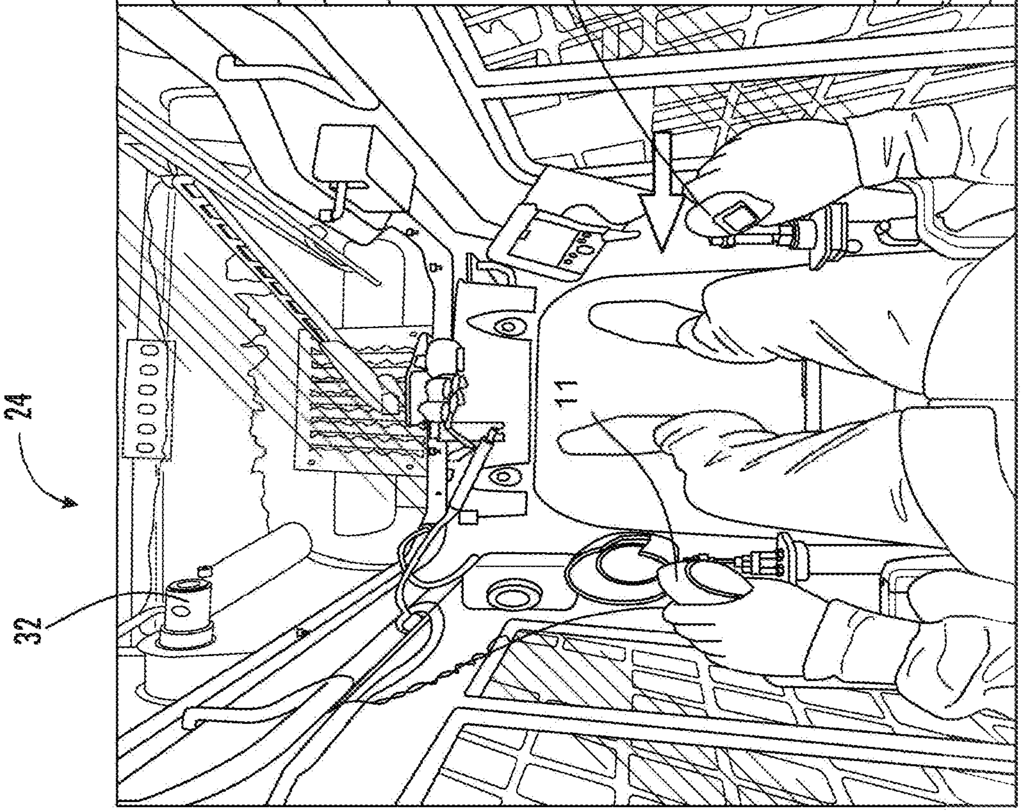
FIG. 16A is a top isometric view of the operator moving the right control stick in a nonlinear or arched leftward position relative to FIG. 9A to rotate the bucket attachment upwards, according to disclosed embodiments.

FIG. 16A shows the operator pivoting right control stick 11 of skid-steer 24 in a nonlinear or arched leftward position relative to the neutral positions illustrated in FIG. 9A. In the orientation of FIG. 16A, the operator pivots right control stick 11 in a leftward rotation position to rotate bucket 26 of skid steer 24 upwards (e.g., to rotate the bucket 26 upwards to support a load). FIG. 16B shows bucket 26 tilting or rotating upwards in response to the position of the right control stick 11 shown in FIG. 16A.

Figure 17A:
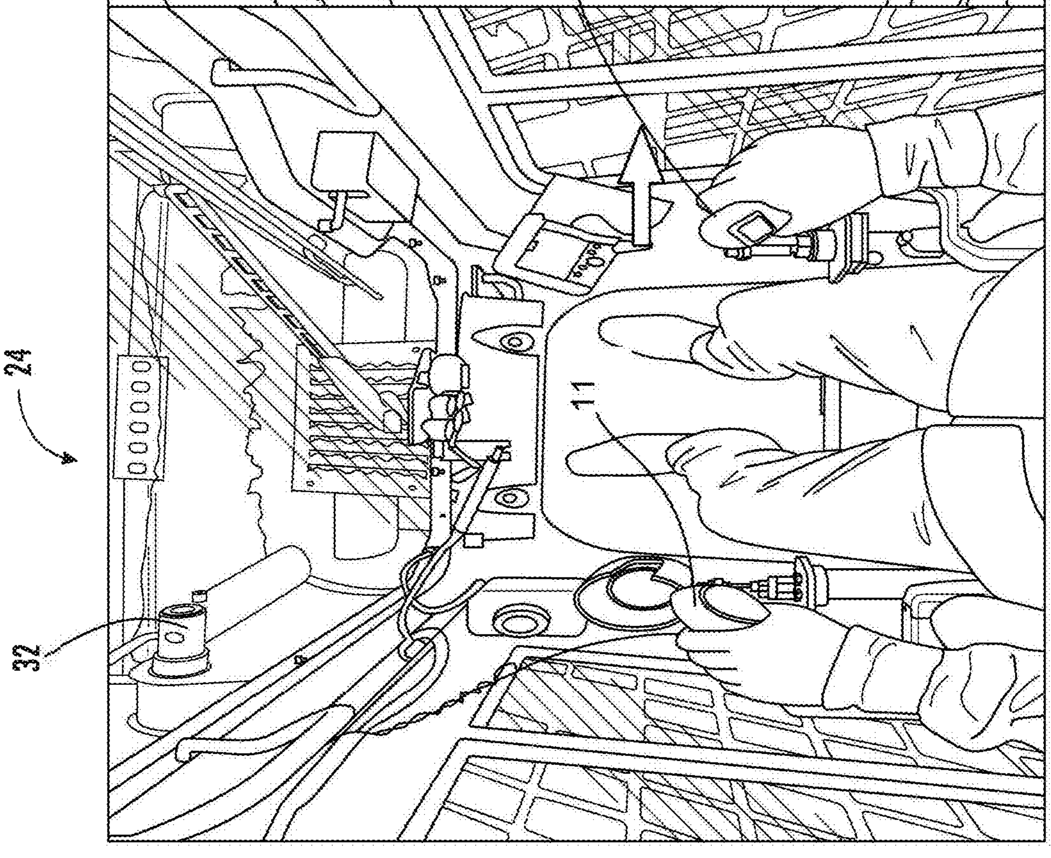
FIG. 17A is a top isometric view of the operator moving the right control stick in a nonlinear or arched rightward position relative to FIG. 9A to rotate the bucket attachment downwards, according to disclosed embodiments.
Figure 17B:
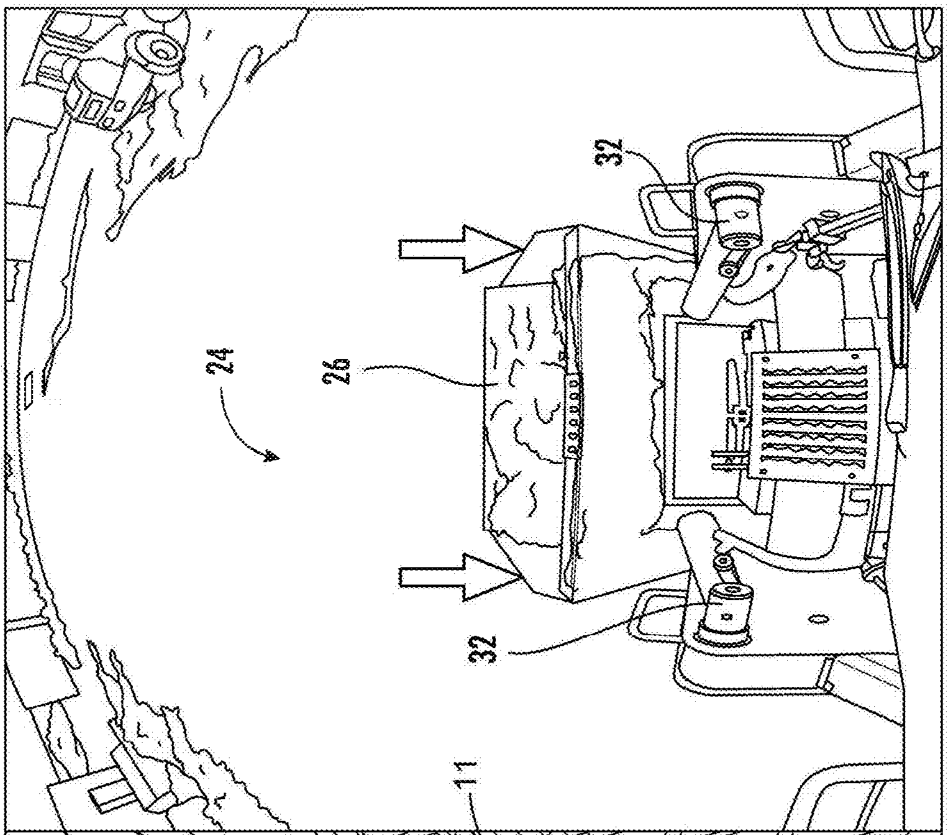
FIG. 17B is a top isometric view of the bucket attachment tilting or rotating downward in response to the position of the right control stick shown in FIG. 17A.

FIG. 17A shows the operator rotating right control stick 11 in a nonlinear or arched rightward position relative to the neutral positions illustrated in FIG. 9A. In the orientation of FIG. 17A, the operator pivots right control stick 11 into the rightward position to tilt or rotate bucket 26 down (e.g., to rotate bucket 26 downwards to dump a load). FIG. 17B shows bucket 26 tilting or rotating downwards in response to the position of the right control stick 11 shown in FIG. 17A.

Figure 18:
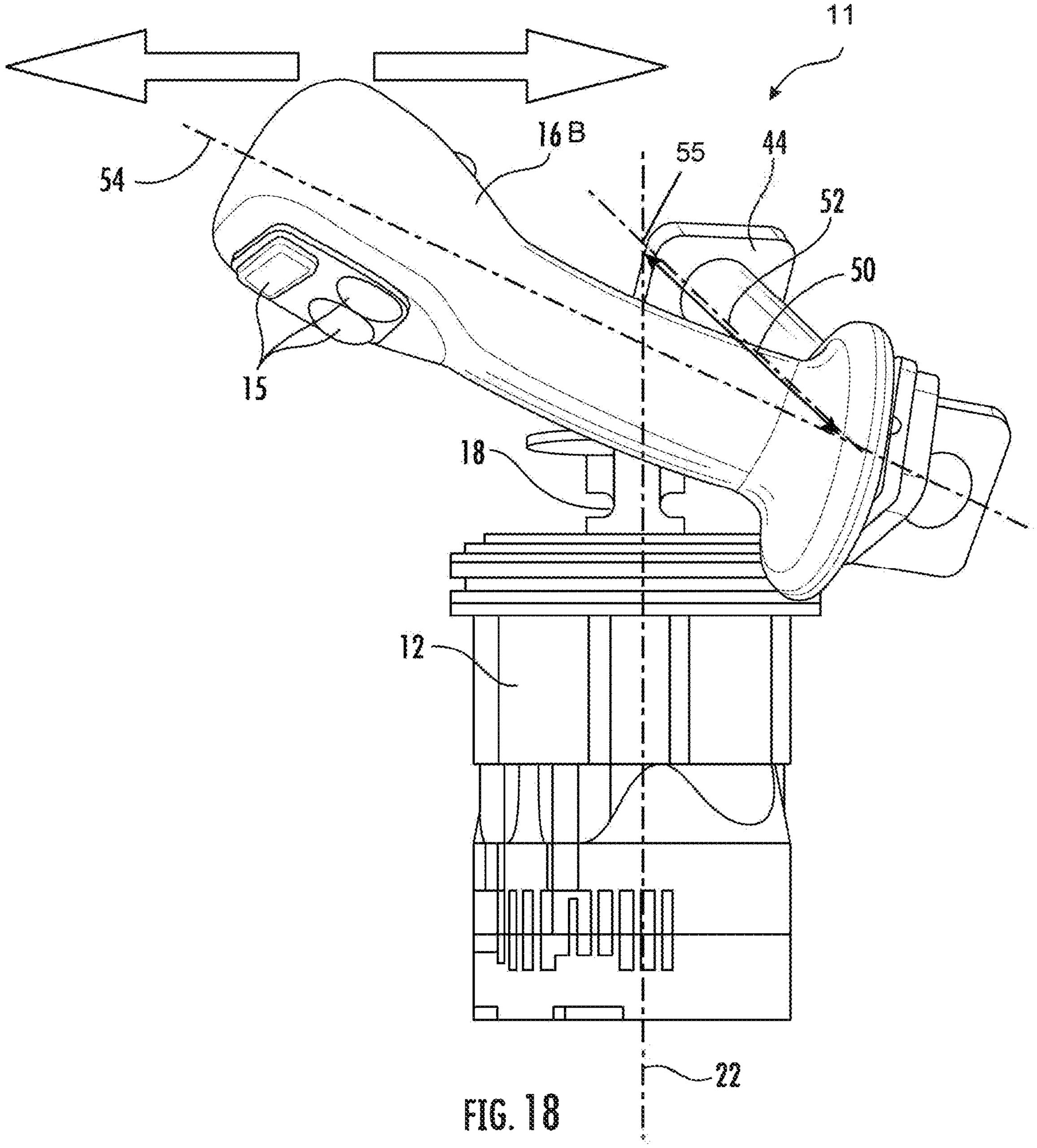
FIG. 18 is a side elevational view of a control stick moving in a nonlinear or arched direction about a pivot point between a forward position and a rearward position, according to disclosed embodiments.
Figure 19:
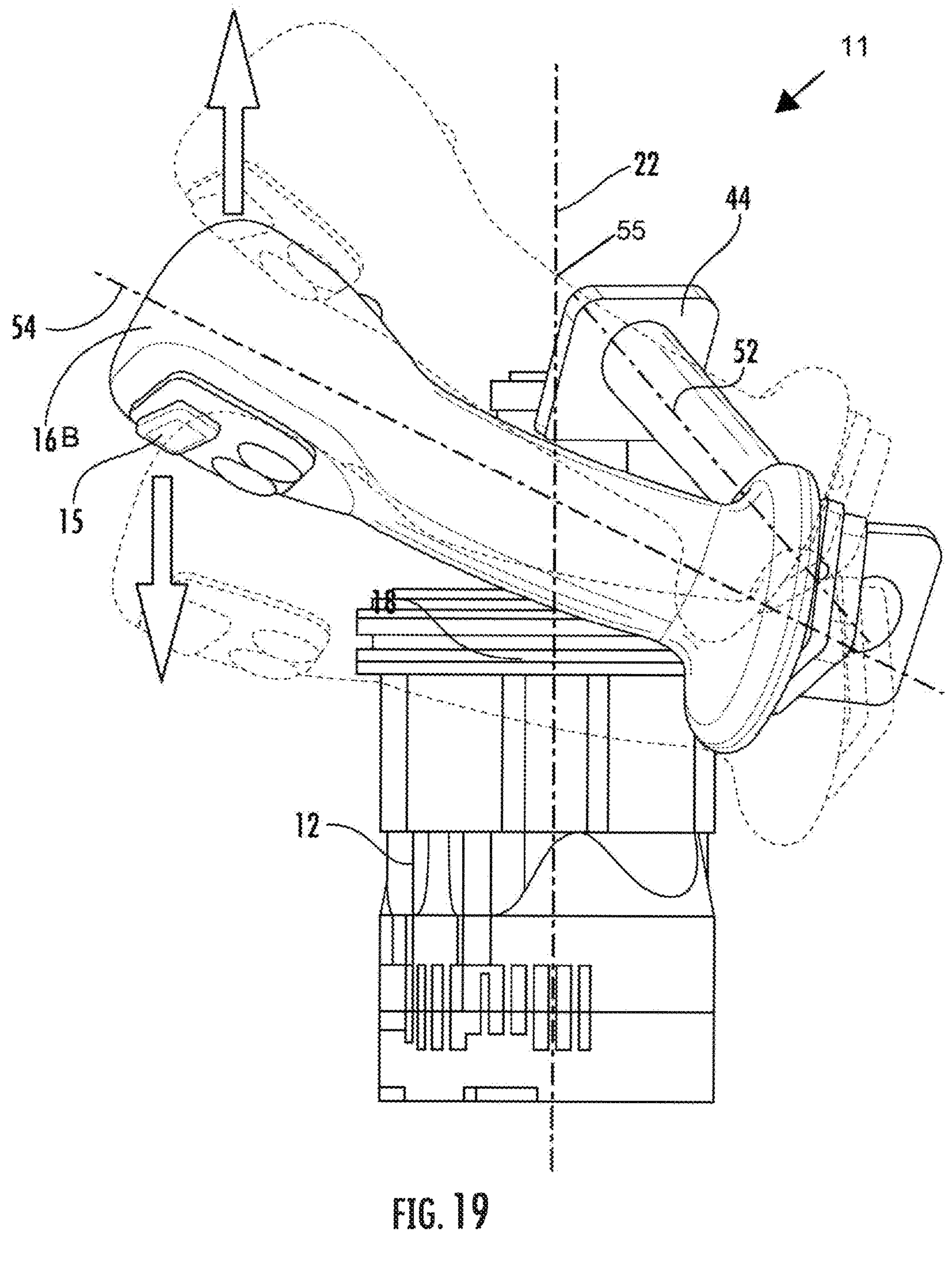
FIG. 19 is a side elevational view of a control stick moving in a nonlinear or arched direction about a pivot point between an upward position and a downward position, according to disclosed embodiments.

FIG. 18 is an isolated side view of a left control stick 11 rotationally pivoting between a leftward position and a rightward position, e.g., in a nonlinear movement configured for wrist control operation. The rotational motion shown in FIG. 18 on left control stick 11 turns the loader vehicle left and right. A similar rotation of right control stick 11 rotates the attachment (e.g., such as bucket 26) upwards and downwards. FIG. 19 is a side view of left control stick 11 moving between a forward position and a backward or rearward position about a pivot 55. The rotational nonlinear motion of FIG. 19 on the left control stick 11 drives the loader vehicle forwards and backwards. A similar pivot of right control stick 11 lifts (e.g., raises) and lowers an attachment (e.g., such as bucket 26).

As shown in FIGS. 18 and 19, offset handle 16B extends along and defines a handle longitudinal axis 54 that is offset by gap 50 from axial axis 22 of shaft 18. Lever 44 extends along and defines transverse axis 52 between axial axis 22 and handle longitudinal axis 54, such that gap 50 extends along transverse axis 52 of lever 44. Offset handle 16B rotates about pivot 55 defined at the intersection of axial axis 22 and transverse axis 52, such that longitudinal axis 54 is offset by gap 50 and can rotate about pivot 55 to enable wrist control of the vehicle and any accessories. The offset created by gap 50 along transverse axis 52 results in a rotational feel for the operator for the movements illustrated in FIGS. 18 and 19. This rotational control also enables an operator to simultaneously control two actions, such as turning right and driving forward, with one wrist action.

In embodiments, longitudinal axis 54 of offset handle 16B, transverse axis 52 of lever 44, and axial axis 22 of shaft 18 are coplanar, such that longitudinal axis 54 and transverse axis 52 intersect at an angle and axial axis 22 and transverse axis 52 intersect at another angle. For example, the angles may be acute, obtuse, or perpendicular, and are oriented such that the axial, transverse, and longitudinal axes 22, 52, and 54 are all coplanar. In another embodiment, axial, transverse, and longitudinal axes 22, 52, and 54 are askew, such that the angles formed at the intersections orient axial axis 22 and longitudinal axis 54 in two separate planes. For example, transverse axis 52 of lever 44 intersects and forms an orthogonal angle with both axial axis 22 of shaft 18 and longitudinal axis 54 of offset handle 16B, and axial axis 22 is askew to longitudinal axis 54. In another embodiment, longitudinal axis 54 is orthogonal to axial axis 22.

As used herein, correlated control device (e.g., sensor 14) can have a positively correlated, negatively correlated, proportional, linear, and/or non-linear relationship between the input and the output.

Figure 20:
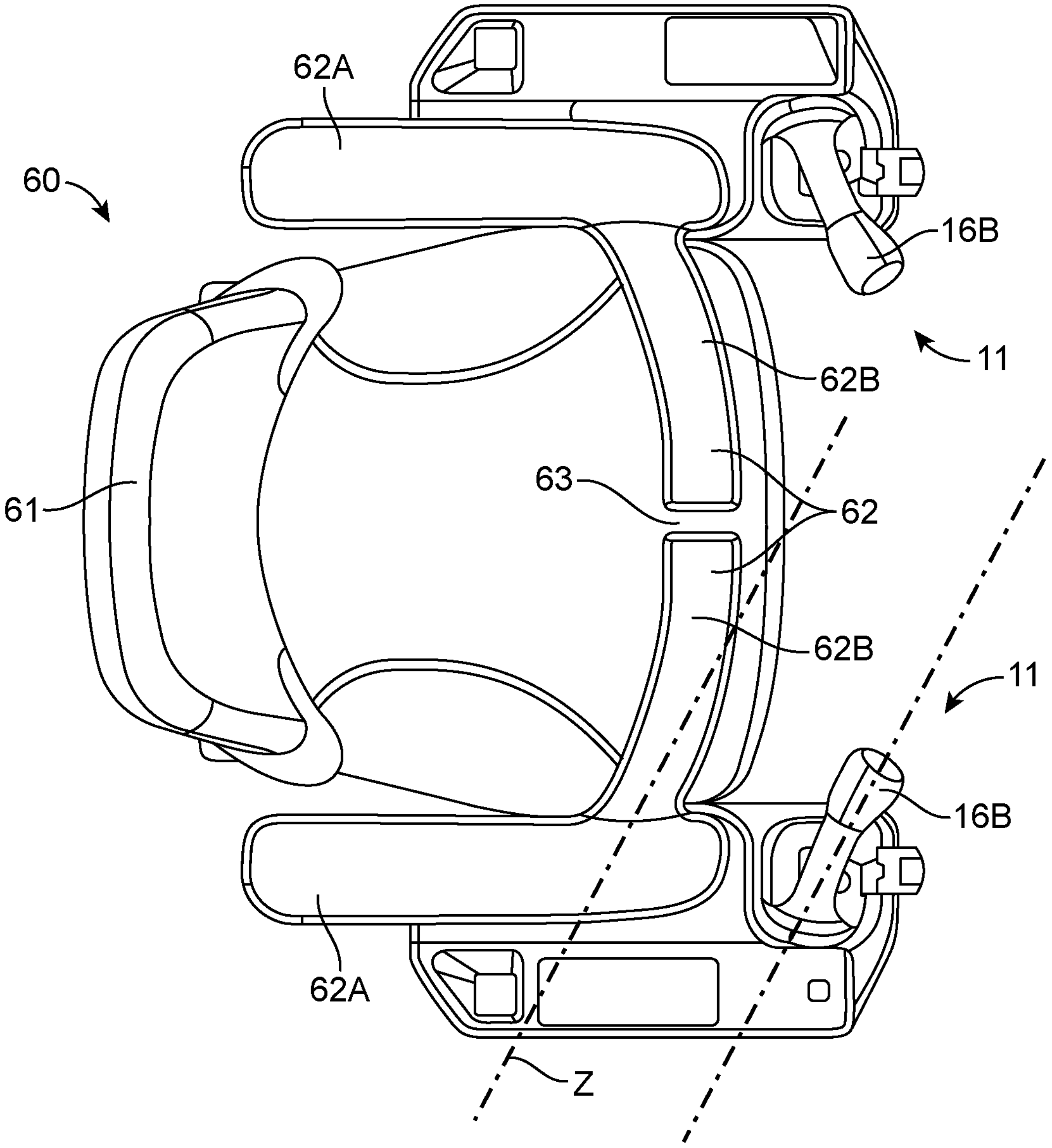
FIG. 20 is a top elevational view of a T-BAR control system according to disclosed embodiments.
Figure 21:
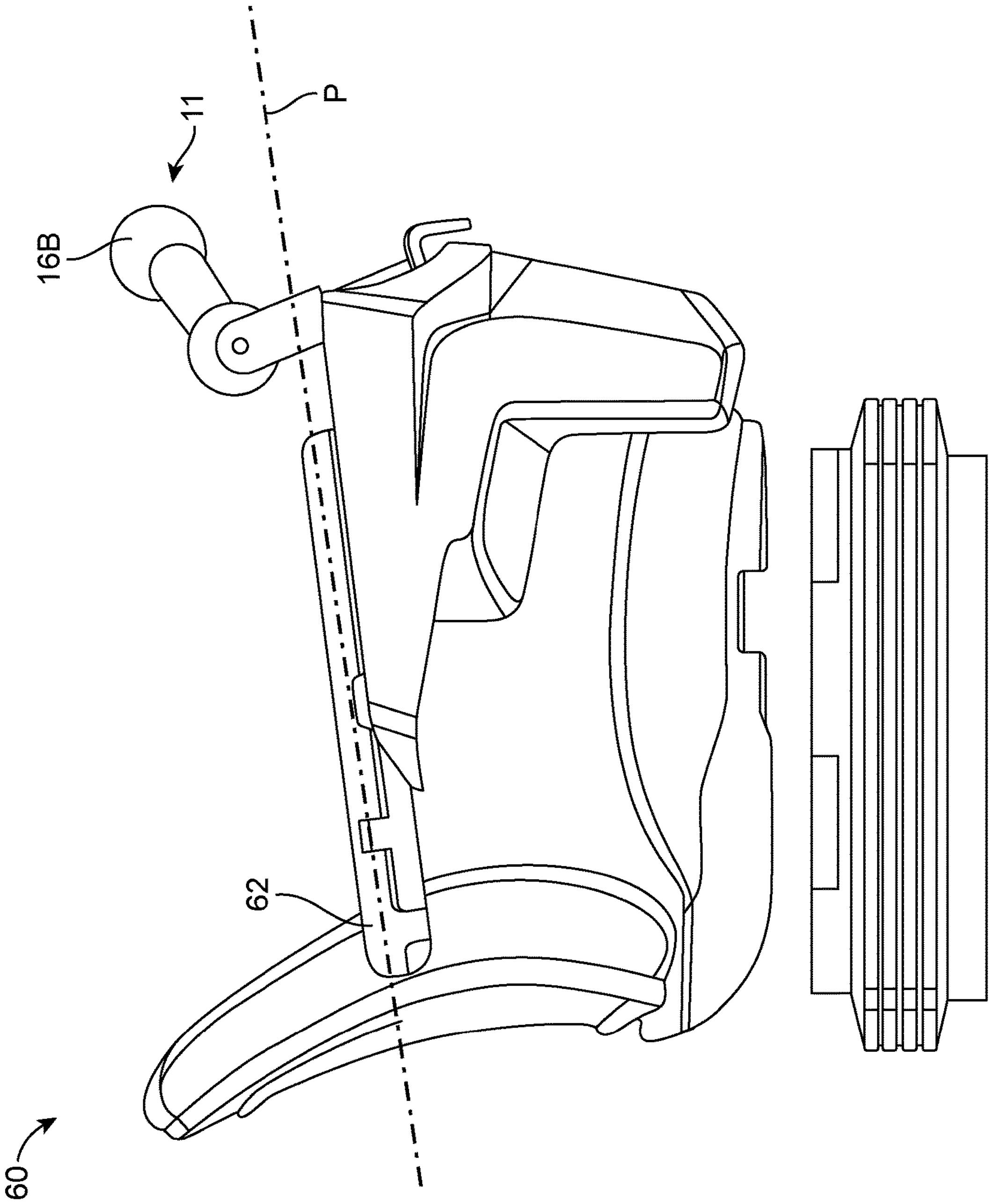
FIG. 21 is a side elevational view of the T-BAR control system of FIG. 20.
Figure 22:
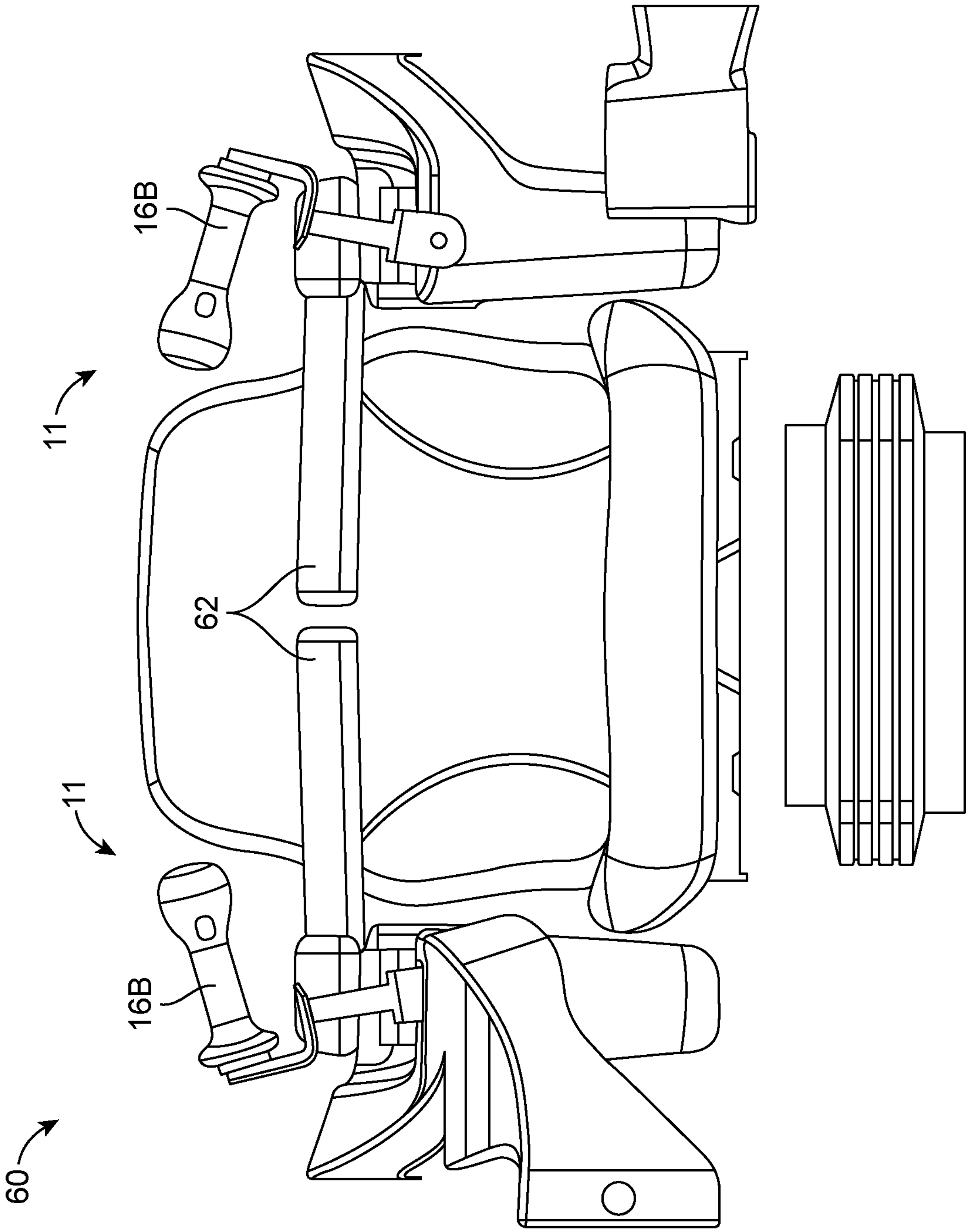
FIG. 22 is a front elevational view of the T-BAR control system of FIG. 20.

FIGS. 20-22 are views of a T-BAR control system 60 according to disclosed embodiments. As seen in FIGS. 20-22, the T-BAR control system can include two instances of the control stick 11 for use in controlling a vehicle and any attachments thereto as described herein. Furthermore, as seen in FIGS. 20-22 the T-BAR control system 60 can include a T-BAR safety control 62 provided in the form of two opposing L-shaped bars that are configured to trigger a halt in operation of the vehicle and/or the attachment when lifted up. The T-BAR may be rotatably engaged whereby the L-shaped bars are in a first position that is open and allows easy access by an operator to a seat 61, and is rotated to a second position whereby the L-shaped bars are in a second, closed position, as depicted in FIGS. 20-22. Each of the L-shaped bars are provided on opposing sides of the seat 61 and include arm rest portions 62*a* and extension portions 62*b* that protrude outwardly from the arm rest portions 62*a* and extend inwardly toward each other and over a portion of the seat 61. When in the closed position, a small gap 63 is provided between the extension portions 62*b*.

Further still, the control sticks 11 employing the offset handle 16B and enabling the rotational control as described above can be configured to replace a traditional mechanical control interface employed by vehicles using the T-BAR safety control 62. Additionally, in some embodiments, the control sticks 11 can be positioned such that the offset handles 16B are aligned with a top portion of the T-BAR safety control 62 such that an operator can rest their arms on the top portion and comfortably maneuver the offset handles 16B.

As shown in FIG. 22, the offset handles 16B may be provided on opposing sides of the seat, adjacent the T-BAR safety control 62 and above a plane P defined by a top surface of the T-BAR safety control 62. In a rest configuration, each of the offset handles 16B may be positioned substantially in line with the corresponding arm rest portion 62A and extend in a substantially parallel manner to an axis z, defined by the extension portions 62*b* of the T-BAR safety control 62. In that way, the offset handle 16B and the extension portion 62*b* are orientated in a similar manner, at least while the offset handle 16B is idle and not being utilized or moved.

It should be understood that the figures illustrate some embodiments in detail, and it should be understood that the present application is not limited to the details or methodology set forth in the description or illustrated in the figures. It should also be understood that the terminology is for the purpose of description only and should not be regarded as limiting. Further modifications and alternative embodiments of various aspects of the disclosure will be apparent to those skilled in the art in view of this description. Accordingly, this description is to be construed as illustrative only. The construction and arrangements, shown in the various embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various embodiments without departing from the scope of the present disclosure.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the disclosure relate to any combination of any of the features described herein whether or not such combination is currently claimed, and any such combination of features may be claimed in this or future applications. Any of the features, elements, or components of any of the embodiments discussed above may be used alone or in combination with any of the features, elements, or components of any of the other embodiments discussed above.

In various embodiments, the relative dimensions, including angles, lengths, and radii, as shown in the Figures, are to scale. Actual measurements of the Figures will disclose relative dimensions, angles, and proportions of the various embodiments. Various embodiments extend to various ranges around the absolute and relative dimensions, angles, and proportions that may be determined from the Figures. Various embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. An electric joystick controller comprising:

a socket having a base and a shaft defining an axial axis, the shaft being pivotable relative to the base in a first direction and in a second direction, the first direction being orthogonal to the second direction;

a correlated output device that is coupled to the base of the socket and sends electronic signals to a processor, the electronic signals being correlated to movement of the socket; and a handle offset from the axial axis and forming a gap between the shaft and the handle.

2. The electric joystick controller of claim 1, further comprising a lever coupling the shaft to the handle and a rubber boot that at least partially surrounds the correlated output device and the socket.

3. The electric joystick controller of claim 1, further comprising an actuator coupled to the processor, wherein the processor sends electronic signals to the actuator, and wherein the correlated output device has an inductor that moves within a coil to send the electronic signals to the processor that are correlated to movement of the socket via the shaft.

4. The electric joystick controller of claim 1, further comprising a lever defining a transverse axis, the lever interconnecting the shaft and the handle and creating the gap between the shaft and the handle along the transverse axis.

5. The electric joystick controller of claim 4, wherein the gap is a non-planar gap that separates the axial axis from a handle longitudinal axis, such that the axial axis and the handle longitudinal axis are askew in two separate planes and offset by the gap, wherein the axial axis and the transverse axis define a first plane, and wherein the handle longitudinal axis and the transverse axis define a second plane.

6. The electric joystick controller of claim 1, wherein a transverse axis is perpendicular to the axial axis, and wherein the transverse axis intersects the socket at either the shaft or the base.

7. The electric joystick controller of claim 6, wherein the transverse axis intersects the axial axis within one inch on either side of the base on the socket.

8. An electric joystick comprising:

a housing;

a shaft pivotably coupled to the housing, the shaft defining an axial axis;

a handle offset from the axial axis; and a lever adjustably interconnecting the shaft to the handle, wherein the shaft pivots about a pivot axis, the handle defines a longitudinal axis, the longitudinal axis is offset from the pivot axis.

9. The electric joystick of claim 8, wherein the lever includes a lever portion extending radially outwardly relative to the axial axis.

10. The electric joystick of claim 9, wherein the lever portion is connected to an end of the shaft and extends toward the housing.

11. The electric joystick of claim 9, wherein a bracket is adjustably coupled to a first end of the lever portion and the shaft is coupled to a second end of the lever portion.

12. The electric joystick of claim 11, wherein the bracket is at least one of translatable relative to the shaft, rotatable relative to the shaft, or radially moveable relative to the shaft along the lever portion.

13. The electric joystick of claim 12, wherein the bracket is translatable and rotatable relative to the shaft via a slot defined in the bracket, and the bracket is radially moveable relative to the shaft via a threaded portion of the lever portion.

14. The electric joystick of claim 13, wherein the lever portion extends through the slot.

15. The electric joystick of claim 8, wherein the lever includes a bracket having a first lobe offset from the axial axis, and a second lobe extending radially from the first lobe.

16. The electric joystick of claim 15, wherein the first lobe extends in a first plane, the lever includes an arm connected to the shaft, the arm and the shaft define a second plane, and the first plane is substantially orthogonal to the second plane.

17. The electric joystick of claim 16, wherein the arm is fixedly connected to the shaft.

18. The electric joystick of claim 15, wherein the first lobe is translatably and rotatably adjustable relative to the shaft, and the handle is translatably and rotatably adjustable relative to the second lobe.

19. The electric joystick of claim 8, wherein a support frame mounted to the housing defines a notch that accommodates the lever.

20. A joystick controller comprising:

a housing;

a shaft pivotably coupled to the housing and defining an axial axis; and a handle fixedly interconnected to the shaft via a bracket, wherein the bracket includes a first lobe and a second lobe, the first lobe defines a first slot, the second lobe defines a second slot, the first slot extends in a first plane parallel to the axial axis, the second slot extends in a second plane nonparallel to the first plane, and the handle is adjustable to a plurality of fixed positions relative to the shaft via the first slot and the second slot.

* * * * *